(12) United States Patent
Carter et al.

(10) Patent No.: US 6,938,651 B1
(45) Date of Patent: Sep. 6, 2005

(54) MATERIAL TRANSFER DEVICE AND METHOD

(75) Inventors: Randall E. Carter, Waynesfield, OH (US); Leslie F. Kohli, Cridersville, OH (US); Brian D. Schumacher, Wapakonetta, OH (US)

(73) Assignee: Precision Thermoplastic Components, Inc., Lima, OH (US)

( * ) Notice: Subject to any disclaimer, the term of this patent is extended or adjusted under 35 U.S.C. 154(b) by 0 days.

(21) Appl. No.: 10/696,466

(22) Filed: Oct. 29, 2003

Related U.S. Application Data

(63) Continuation-in-part of application No. 10/082,590, filed on Feb. 23, 2002.

(51) Int. Cl.[7] .............................................. B65B 1/04
(52) U.S. Cl. ..................... 141/67; 141/383; 251/149.6; 285/319
(58) Field of Search .......................... 141/67, 383, 351; 251/149.6; 285/319

(56) References Cited

U.S. PATENT DOCUMENTS

| | | |
|---|---|---|
| 748,742 A | 1/1904 | Jeffery |
| 4,458,719 A | 7/1984 | Strybel |
| 4,858,792 A | 8/1989 | de Laforcade |
| 4,895,190 A | 1/1990 | Gillen |
| 4,941,600 A | 7/1990 | Berriochoa |
| 4,995,417 A | 2/1991 | Naku |
| 5,154,323 A | 10/1992 | Query |
| 5,305,784 A | 4/1994 | Carter |
| 5,324,082 A | 6/1994 | McNaughton |
| 5,406,980 A | 4/1995 | Allread |
| 5,492,305 A | 2/1996 | Kish |
| 5,765,601 A | 6/1998 | Wells |
| 6,098,032 A | 8/2000 | Brookner |
| 6,260,739 B1 | 7/2001 | Hsiao |
| 6,382,469 B1 | 5/2002 | Carter |

OTHER PUBLICATIONS

Drawings and description of a tire inflator connector attached, no date.

*Primary Examiner*—Steven O. Douglas
(74) *Attorney, Agent, or Firm*—Robert R. Hussey Co., PA

(57) ABSTRACT

A material transfer device for transferring material from a pressurized container to the connector on an automotive air conditioning system or tire is provided having an actuator, fluid conveying tube and a quick connect fitting for attachment to the automotive connector. The quick connect fitting has a one piece plastic body and a plastic locking sleeve mounted on the body for attaching and detaching the quick connect fitting to the automotive connector. The plastic body has locking tabs integrally formed therewith for engaging the automotive connector. The locking tab is moveable between a locked position and an unlocked position. The locking sleeve retains the locking tab in the locked position. The quick connect fitting also has cooperating prongs to allow assembly of its components, restrain disassembly, and provide frictional forces during relative movement of the sleeve and body. A method is also provided.

28 Claims, 15 Drawing Sheets

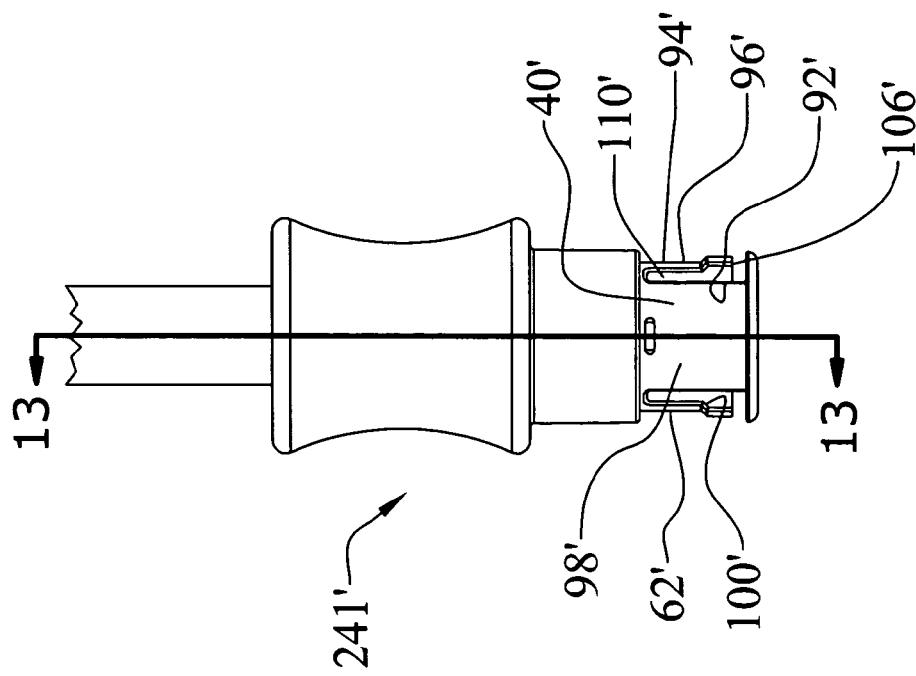
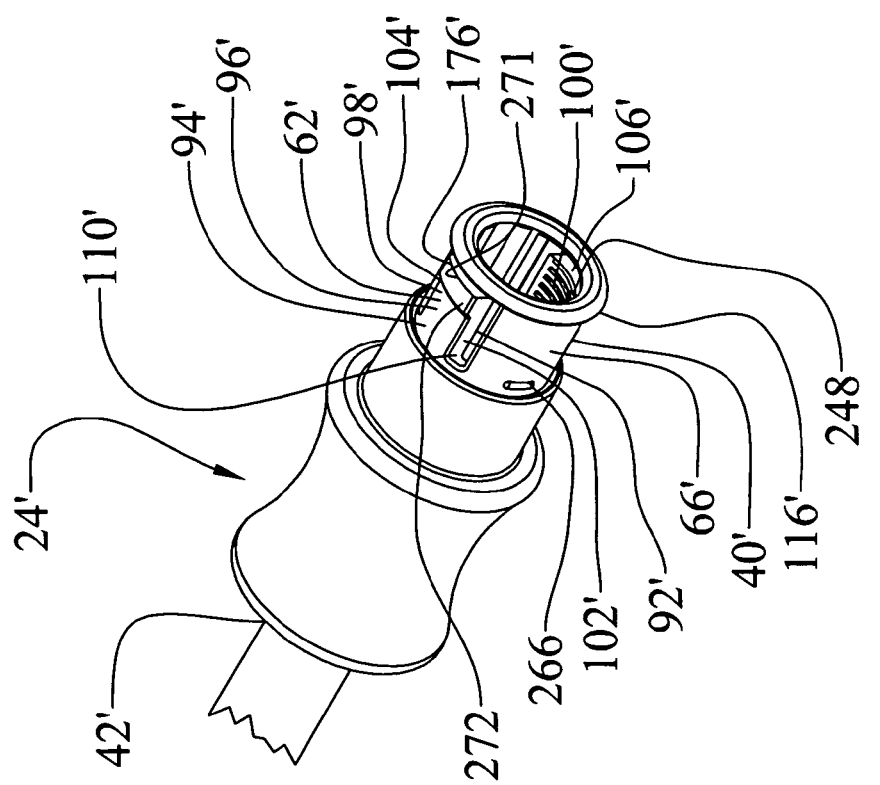

MATERIAL TRANSFER DEVICE AND METHOD

CROSS REFERENCE TO RELATED APPLICATIONS

This is a Continuation-in-Part of application Ser. No. 10/082,590 filed Feb. 23, 2002.

BACKGROUND OF THE INVENTION

The present invention relates in general to refrigerant material transfer devices for automotive air conditioning systems and more particularly to refrigerant material transfer devices having quick connect fittings with design features for manufacture of the fittings from plastic material.

The present invention also relates in general to tire sealant material transfer devices for automotive tires and more particularly to tire sealant material transfer devices having quick connect fittings with design features for manufacture of the fittings from plastic material.

Automotive air conditioners periodically require servicing to maintain the proper level of refrigerant for efficient operation of the air conditioner. Automotive air conditioners have valved connectors for recharging the air conditioner with additional refrigerant or other materials, such as lubricants. On occasion, a small amount of refrigerant should be added to the air conditioner to increase their cooling effect and efficiency.

Service stations have equipment for recharging automotive air conditioners but the inconvenience and costs for performing this service are substantial. It is desirable for a consumer to inexpensively recharge his own automotive air conditioner at his convenience. It is also desirable that the cost of such an automotive air conditioning recharger be minimized with improved operational features.

In many cases, it is difficult to position tools or the operators fingers to mechanically attached an air conditioning recharger, such as by a threaded connector, to the automotive air conditioner connector. Accordingly, it is desirable provide a quick connect connector that provides for attachment to the automotive air conditioner connector quickly and efficiently without the need for additional tools or manual twisting of the connector components.

Do-it-yourself automotive air conditioner rechargers are known. One such recharger provides an aerosol can having refrigerant and oil therein with a valve in fluid communication with the aerosol can. A tube is attached to the valve and conveys the refrigerant to a quick connect fitting. The quick connect fitting is attachable to and detachable from the valved connector on the automotive air conditioner and allows refrigerant to flow into the automotive air conditioner when attached to the automotive connector.

The quick connect fitting has a series of balls positioned in pockets about its outer periphery to engage a depression in the air conditioner connector. The known quickconnect fitting has an outer sleeve biased with a spring toward the series of balls to urge the balls toward the depression in the air conditioner connector. A spring clip is provided to stop move of the outer sleeve which would allow disassembly of the numerous components of this known quick connect fitting. The assembly of this quick connect fitting requires the positioning of the balls in their respective pockets, assembling the outer sleeve with its biasing spring and assembling the spring clip to prevent disassembly of these components. The cost of the numerous components of such a quick connect fitting, along with the cost of their assembly result in a more costly product for the consumer to recharge his automotive air conditioner.

Accordingly, it is desirable to provide a quick connector that has a fewer parts that are more readily assembled and in which the parts are particularly designed to be formed in plastic. In order to provide a quick connector that is easy to assemble, it is desirable to allow for assembly of the sleeve and body of the quick connector by simply sliding them into an assembled relationship and when assembled, restrain the disassembly of the body and sleeve without additional separate components.

When operating a quick connector, it is desirable to maintain the body and sleeve in either a locked position, in which the quick connector is secured to the automotive connector, or an unlocked position, in which the quick connector can be freely removed from the automotive connector without requiring additional parts.

Gillen, U.S. Pat. No. 4,895,109, discloses an actuator and hose assembly for use with an aerosol container to recharge the automotive air conditioner. The Gillen reference provides an aerosol can having refrigerant therein with a valve in fluid communication with the aerosol can. A tube is attached to the valve and conveys the refrigerant to a threaded fitting which attaches to the automotive connector. The threaded fitting may be of any known design and is attachable to and detachable from the valved connector on the automotive air conditioner. The threaded fitting allows refrigerant to flow from the aerosol container into the automotive air conditioner when attached to its connector. The particular threaded fitting shown in Gillen does not allow for quick connection of the assembly to the automotive air conditioner connector.

The automotive connector is valved so that refrigerant cannot escape the automotive air conditioner unless the automotive connector valve is actuated. Once the automotive connector valve is actuated, it is desirable to allow flow of refrigerant into the automotive air conditioner but not allow refrigerant to flow or escape from the automotive air conditioner. One known automotive connector valve design is a known Schrader valve. Such a valve has a pin that when depressed opens the valve. Normally, the valve is in a closed position in which refrigerant is sealed in the air conditioning system.

White, U.S. Pat. No. 3,976,110, discloses a do-it-yourself kit for recharging an automobile air conditioning system by connecting the source of refrigerant to the automotive connector with a threaded fitting. Hatch, U.S. Pat. No. 4,644,92, discloses a refrigerant material transfer adapter which also threadedly engages the air conditioner fitting. Trachtenburg, U.S. Pat. No. 6,089,032, teaches a kit and method for retrofitting an automobile air conditioner.

Known connectors have devices to actuate the automotive connector valve and check valves to allow flow of refrigerant into the automotive air conditioner but not allow refrigerant to flow or escape from the automotive air conditioner.

In the design of a plastic quick connect fitting, it is desirable to provide a plastic check valve that snaps into engagement with another part of the fitting so that it is secured thereto without any separate fastening components. This allows for ready assembly of the valve. It is also desirable that such a plastic valve is sufficiently strong to open the automotive connector valve while providing for a snap fit when assembling the plastic quick connect fitting. It is also desirable that the plastic quick connect fitting valve allows refrigerant to flow through the valve when the valve ball is resting against its valve cage. It is also desirable to provide a plastic quick connect fitting valve that allows sufficient flow of refrigerant therethrough when transferring refrigerant from the refrigerant container to the automotive air conditioner.

Modern pneumatic tires are designed for extended use on vehicles, such as automobiles and trucks, over many miles. Regardless of how well these tires are designed, they can still be punctured by sharp objects inadvertently left on the roadway and go flat. When the tire is punctured, the motorist must change the tire if he has a spare or have another tire put on the vehicle. In some instances, it is difficult to change the tire due to the location of the vehicle, such as when the puncture occurs on roadway which is not flat and the vehicle cannot be safely raised with a jack to change the tire. Other instances are dangerous to change the tire, such as for example, when the tire is punctured on a heavily traveled roadway and there is not sufficient space to change the tire safely.

Various tire inflator and sealant products have been developed for both sealing the puncture in a tire and also inflating the tire so that it can be used to resume travel where the tire puncture may be repaired. These tire inflator and sealant products generally include a container having an inflator and sealant composition contained therein under pressure. This composition is releasable through a valve in the discharge end of the container. These compositions in the container typically include a liquefied gas in a sufficient quantity to re-inflate the tire to a driveable condition and a sealant material for sealing the puncture when introduced into the tire.

An actuator is provided for attachment to the pressurized container to activate the upstanding valve so that the tire sealant material passes through the valve and then through the actuator to a discharge tube attached to the valve on the tire.

A connector is provided to connect the discharge tube to the tire valve. In operation, the motorist attaches the discharge tube to the valve on the punctured tire with the connector and then activates the actuator which in turn activates the valve in the pressurized container to release the tire sealant composition into the tire.

As the motorist actuates or depresses the actuator, the inflator and sealant composition flows into the actuator from the canister valve and proceeds through the discharge tube and then through the valve on the punctured tire into the tire. If the inflator and sealant composition is allowed to escape at the junction between the connector and the tire valve, both the inflator and sealant are not introduced into the tire. Accordingly, it is desirable to provide a connector that maintains the connection between the actuator and the tire valve so that the inflator and sealant does not escape at that junction.

The motorist often connects the connector to the tire valve under adverse conditions and it is desirable to connect and disconnect the connector to and from the tire valve as quickly as possible. In cold weather, it is desirable to connect and disconnect the connector to and from the tire valve while wearing gloves. It is also desirable to minimize leakage of tire sealant material when the connector is disconnected from the tire valve after discharging tire sealant material into the tire. It is also desirable to provide a connector that provides for maintaining alignment between the tire valve and the connector when they are attached.

Other tire valve connectors are known. Many such connectors have threads that engage the threads on the outer surface of the tire valve. Such connectors do not allow a quick connection or disconnection to or from a tire valve and are particularly difficult to manipulate while wearing gloves. In such designs, there is the potential problem of crossthreading the connector and tire valve, leakage of tire sealant material upon disconnection of the connector and tire valve.

A known tire valve connector is provided for attaching a container having tire puncture sealing material to the valve of a tire. As is known, the tire valve has a pin which when depressed, opens the tire valve. The tire valve connector has an inner member and an outer member further described in the information disclosure statement filed herewith. The outer member has an input end which is attachable to the container having tire puncture sealing material. The outer member also as an output end which is attachable to a tire valve so that tire puncture sealing material can flow through the tire valve connector and into the tire.

The inner member is slidably received in the outer member and has four fingers which are positioned adjacent the output end of the outer member. There are spaces between the fingers to allow movement of the fingers. The fingers have ribs thereon for gripping the outside of the tire valve.

When it is desirable to connect the tire sealing material container to the tire valve and convey the tire sealing material into the tire through the valve, the tire valve is positioned adjacent the output end of the tire valve connector. The tire valve is inserted between the fingers until the end of the valve contacts and seats on the sealing washer and the tire valve pin is depressed to open the tire valve. The inner member has a tire valve depressor that contacts the tire valve pin to open it when the tire valve is so moved. The inner member has a passageway to allow tire sealing material to flow therethrough and into the tire.

As the tire valve is continued to be moved towards the input end of the outer member, the outer surfaces of the fingers have a cam surface which are complimentary to cam surfaces on the inside of the outer member. Upon further movement of tire valve towards the input end of the outer member, the fingers are camed inwardly by the complimentary cam surfaces so that the fingers move radially inwardly with the ribs gripping the outside of the tire valve. The outer member has an opening and a series of ribs which contact the outer surface of the inner member and guide the inner member as it moves towards the input end of the outer member.

In this position, the tire valve is in an open position and in fluid communication with the container having tire puncture sealing material. To introduce tire puncture sealing material into the tire, an actuator between the valve connector and the container having tire puncture sealing material therein is activated to allow tire puncture sealing material to flow through the tire valve connector, through the tire valve and consequently into the tire.

After a sufficient amount of tire puncture sealing material is transferred to the tire, the actuator is deactivated to keep the rest of the tire puncture sealing material in its container. The tire valve is then removed from the tire valve connector by moving it away from the connector. A series of raised staked portions are formed in the output end of the outer member. These staked portions are formed after the inner member is assembled with the outer member and hold the inner member in an assembled position as the tire valve is disengaged from the tire valve connector.

SUMMARY OF THE PRESENT INVENTION

The present invention provides a material transfer device for transferring materials, such as a refrigerant, tire sealant or other materials, from a pressurized container to the connector on an automotive air conditioning system or tire valve with the above described desirable features. For ease of description, the connector on an automotive air conditioning system and tire valve may be referred to as the automotive connector.

The material transfer device of the present invention provides an actuator for attachment to the pressurized container, such as an aerosol can, having pressurized refrigerant or tire sealant therein and a quick connect fitting for attachment to the automotive air conditioning connector or tire valve, as the case may be. The quick connect fitting has design features which provide for the manufacture of the quick connect fitting from plastic material. A connecting tube is also provided to interconnect the actuator and the quick connect fitting. When the actuator is attached to the pressurized container and quick connect fitting is attached to the automotive air conditioning connector or tire valve, the actuator may be actuated and moved from a normally closed position to a discharge position to release refrigerant into the automobile air conditioner or tire sealant material into the tire.

The design of the quick connect fitting of the present invention incorporates advantageous design features for manufacture of the quick connect fitting from plastic material. The quick connect fitting design of the present invention provides an automotive air conditioning recharger or tire sealant device that can be manufactured with cost savings without impairing the operational features thereof. One of the advantageous operational features provided by the quick connect fitting is the attachment of the quick connector to the automotive connector quickly and efficiently without the need for additional tools or manual twisting of the connector components.

The quick connector of the present invention provides a one-piece plastic body that has one end attached to the connecting tube and its other end selectively attachable and detachable from the automotive connector. The plastic body has a fluid passageway extending from the connecting tube to the other end which is attachable to the automotive connector. The body has locking tabs formed integrally with the body which locking tabs are movable with respect to the body. The tabs have a connector engaging lip for selectively engaging and disengaging the automotive connector.

The quick connector of the present invention has a plastic locking sleeve mounted on the plastic body for selectively locking and detaching the quick connect fitting of the present invention to the automotive connector. The quick connector is secured to the automotive connector by simply aligning the connectors and urging them together. As the quick connector moves towards the automotive connector, the connector engaging lips come into engagement with a depression in the automotive connector and secures the quick connect body to the automotive connector.

In order to lock the locking tabs in this securing position, the plastic locking sleeve is urged towards the connector engaging lips of the locking tabs. The locking tabs have a raised portion adjacent the connector engaging lips. When the plastic locking sleeve is moved from a retracted position to a locking position, the sleeve contacts the raised portions of the locking tabs to urge the connector engaging lips towards the depression in the automotive connector. In this locked position, the locking sleeve frictionally engages the raised portions to maintain the locking sleeve in the locked position. If it is desired to detach the quick connector from the automotive connector, the locking sleeve is simply manually moved from the locked position to the retracted position. The locking tabs are then free to move and the quick connector can be moved away from the automotive connector.

As can be seen from the above, the present invention provides a quick connector that may be quickly and efficiently attached to and detached from the automotive connector without the need for additional tools or manual twisting of the connector components.

The quick connector of the present invention also provides for assembly of the locking sleeve and body of the quick connector by simply sliding them into an assembled relationship and when assembled, restrains the disassembly of the body and sleeve without additional separate components or manufacturing steps. To accomplish this feature, the locking sleeve has assembly prongs formed integrally with the locking sleeve and movable with respect thereto. The body has a prong engaging surface.

To assemble the sleeve and body, the components are positioned adjacent each other and as they are moved together, the assembly prongs contact the prong engaging surface of the body. As movement of these components continue, the prongs slide along the prong engaging surface and are moved along the sleeve until they are in a stop depression having a stop surface. At this point, the prongs are positioned in the stop depression and engage the stop surface. If an attempt is made to disassemble the sleeve and body, the prongs engage the stop to restrain disassembly. The other end of the body has a stop portion which restrains the locking sleeve from being disassembled by movement past the other end of the body.

To restrain inadvertent movement between the sleeve and the body, the prongs are in frictional engagement with the prong engaging surface of the body as they are moved between the locked and retracted positions.

It is important to recognize that the body, locking sleeve, and valve cage of the quick connector of the present invention are designed to be manufactured in plastic material that "remembers" the configuration in which it is formed. This material memory allows for elastic deformation of the components by exerting a force thereon and the return of the material to its molded configuration. The locking tabs and the prongs may be deformed and exert a force to return to their molded position. This feature allows for designing the quick connector of the present invention without requiring springs, and inexpensively molded and assembled.

The quick connector of the present invention also provides a check valve to allow the flow of refrigerant into the automotive air conditioner but not allow refrigerant to flow or escape from the automotive air conditioner. The quick connector of the present invention has a valve cage that snaps into engagement with the body so that it is secured thereto without any separate fastening components. This design allows ready assembly of the valve cage and its associated valve ball. The plastic valve cage is sufficiently strong to depress the valve of the automotive connector valve while providing for a snap fit when assembling the plastic quick connect fitting of the present invention. The valve cage design allows refrigerant to flow through the check valve even if the ball is resting against the valve cage and is designed to allow sufficient flow of refrigerant therethrough when transferring refrigerant from the refrigerant container to the automotive air conditioner.

BRIEF DESCRIPTION OF THE DRAWINGS

FIG. 1a is an enlarged view of the refrigerant material transfer device indicated by the circle 1a in FIG. 1.

FIG. 10 is an enlarged perspective view of a portion of the tire sealant material transfer device shown in FIG. 9 including a quick connect fitting attached to a tube.

FIG. 11 is a side view of the quick connect fitting shown in FIG. 10.

DETAILED DESCRIPTION OF THE INVENTION

Figure 1:
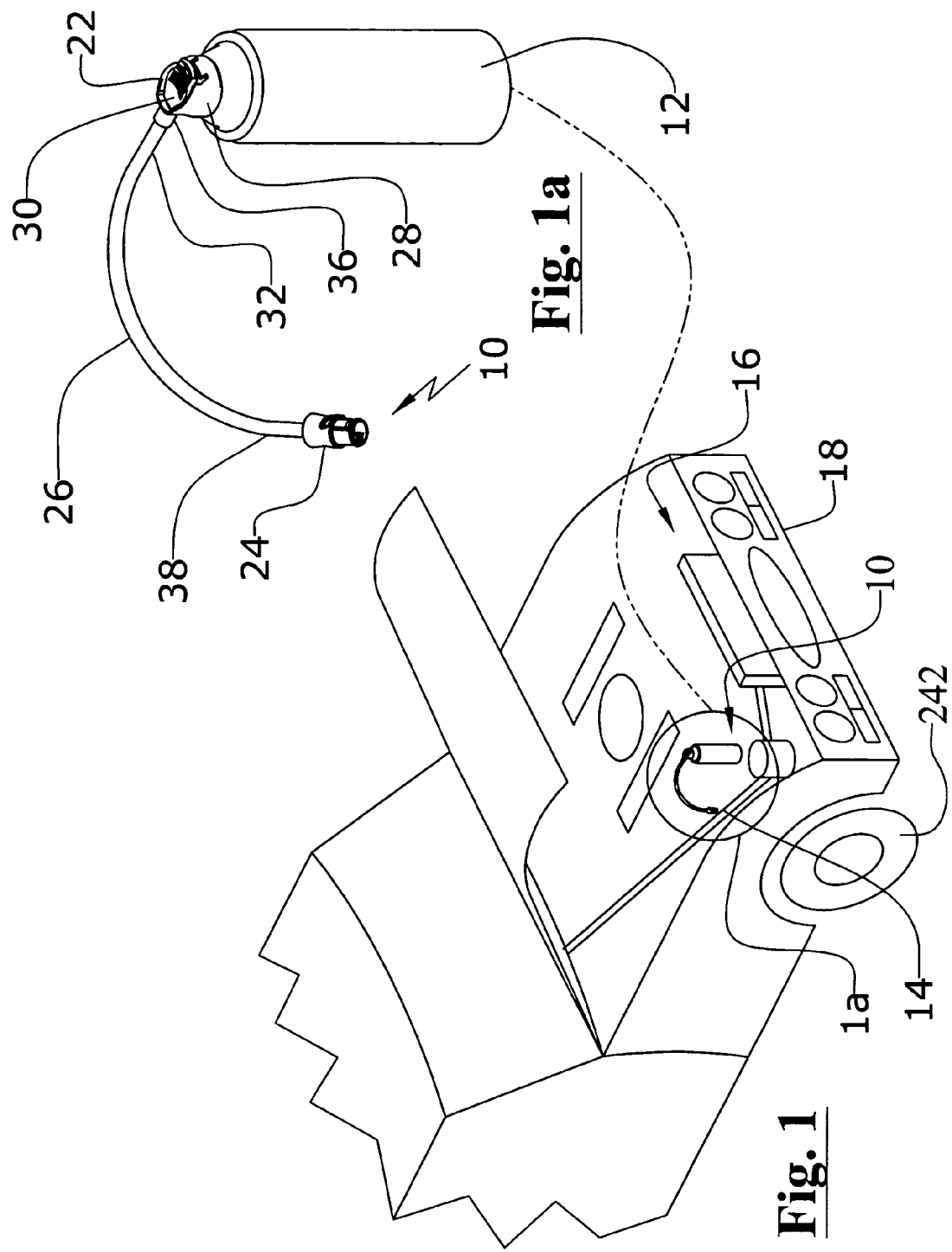
FIG. 1 is a schematic view of a refrigerant material transfer device for interconnecting a pressurized refrigerant canister to the air conditioning recharge fitting on a vehicle.
Figure 2:
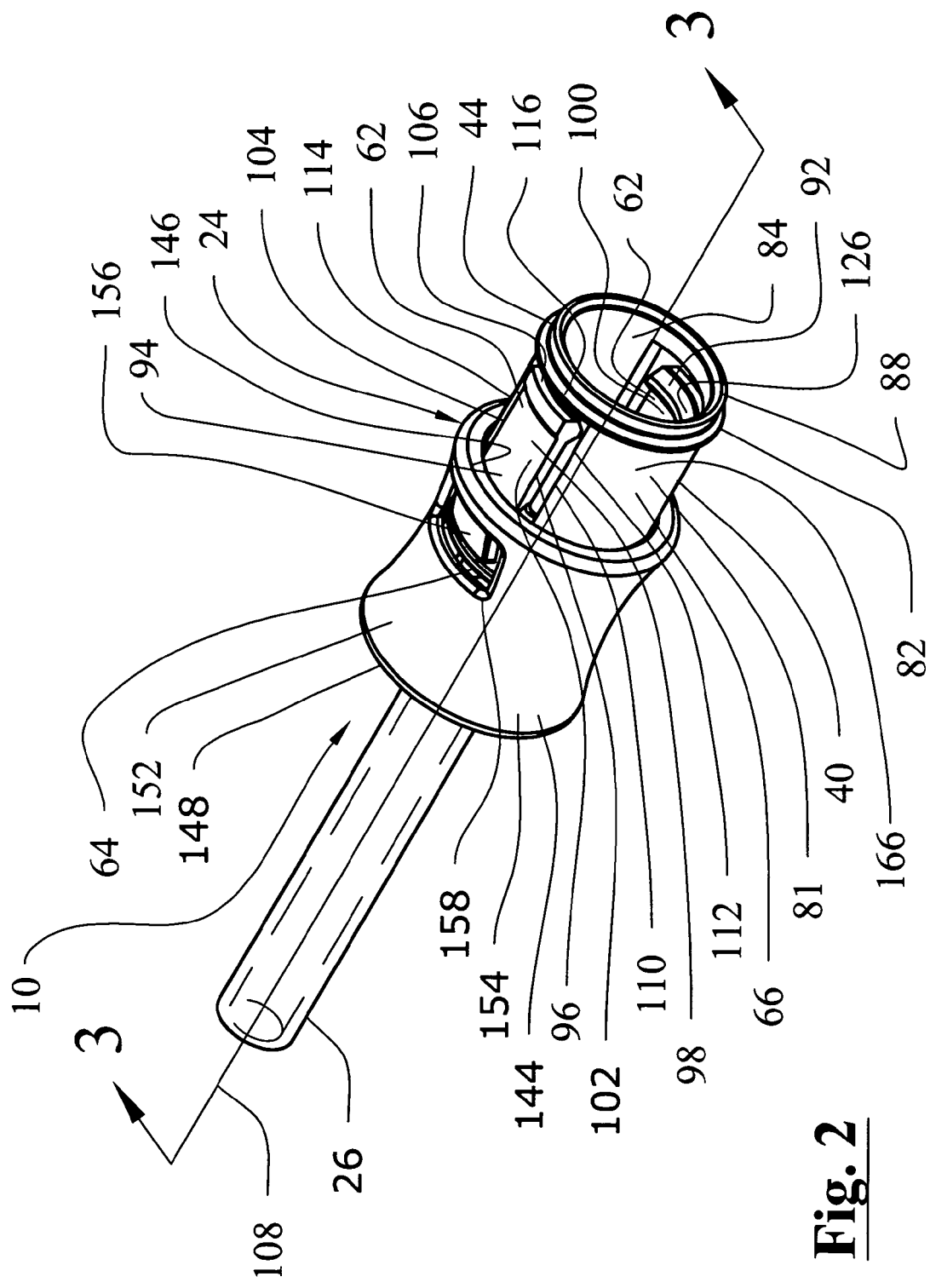
FIG. 2 is a perspective view of a portion of the refrigerant material transfer device shown in FIG. 1 including a quick connect fitting attached to a tube.
Figure 3:
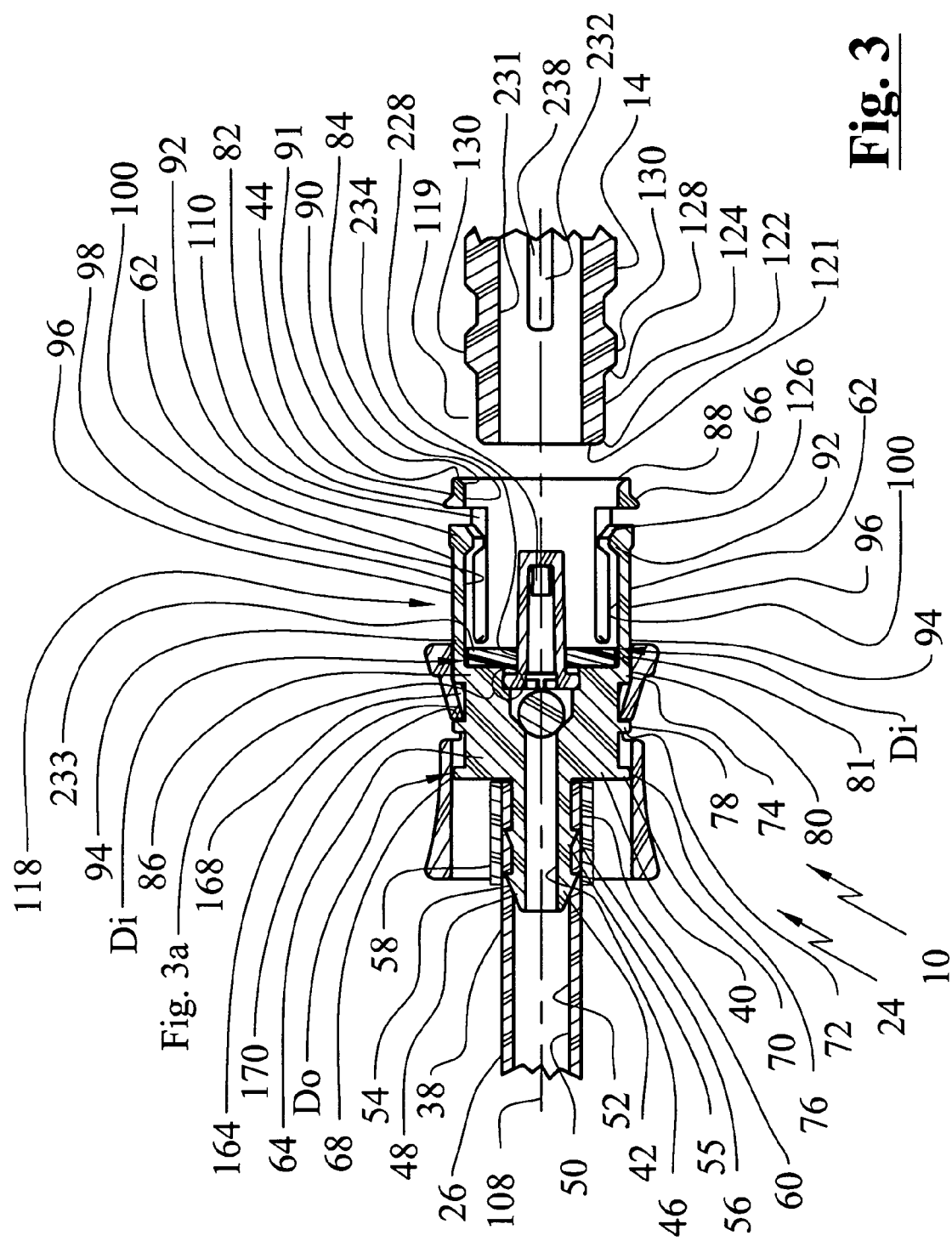
FIG. 3 is a sectional view of the quick connect fitting shown in FIG. 2 taken along line 3—3 thereof and in alignment with a recharge fitting.

The present invention provides an improved refrigerant material transfer device 10 for transferring a refrigerant from a pressurized container 12 to the connector 14 on an automotive air conditioning system 16 of a vehicle, such as an automobile 18, as shown in FIGS. 1–3. It should be understood that the refrigerant material transfer device 10 of the present invention may be used with any automotive air conditioning system on any type of vehicle. The automotive air conditioner 16 has a valved connector 14 for recharging the air conditioner.

On occasion, a small amount of refrigerant should be added to the air conditioner 16 to increase its cooling effect and efficiency. The refrigerant material transfer device 10 of the present invention provides for recharging the air conditioner 16 to replenish the amount of refrigerant in the air conditioner with additional refrigerant from the pressurized container 12.

The refrigerant material transfer device 10 of the present invention provides an actuator 22 for attachment to the pressurized container, such as an aerosol can 12, having pressurized refrigerant therein and a quick connect fitting 24 for attachment to the automotive air conditioning connector 14. A fluid conveying tube 26 is also provided to fluidically interconnect the actuator 22 and the quick connect fitting 24 to allow the flow of refrigerant from the actuator to the quick connector 24.

The actuator 22 may be of any design, such as the actuator described in applicants U.S. Pat. No. 6,382,469 entitled "Tire Inflation Actuator", which describes the operation thereof and movement between a closed and discharge position. The actuator 22 is attachable to and detachable from the pressurized container 12. The actuator 22 is in fluid communication with the refrigerant in the container 12 and has a valve 28 in a normally closed position in which the flow of refrigerant from the container is blocked. The actuator 22 has a finger tab 30 which when depressed, moves the valve 28 to a discharge position so refrigerant flows from the container 12 through the actuator to the connecting tube 26. The tube 26 has an inlet end 32 in fluid communication with and attached to the actuator 22 by any known manner, such as the connector 36. The outlet end 38 of the tube 26 is in fluid communication with and attached to the quick-connect fitting 24 as will hereinafter described.

The quick connect fitting 24 has advantageous design features with fewer parts that are more readily assembled with cost savings and provide improved operational features. Further, the parts are particularly designed to be formed in plastic. One of the advantageous operational features provided by the quick connect fitting 24 of the present invention is the attachment of the quick connector 24 to the automotive air conditioner connector 14 quickly and efficiently without the need for additional tools or manual twisting of the connector components.

As seen in FIGS. 2 and 3, the quick connector 24 of the present invention provides a one-piece plastic body 40 that has an inlet end 42 attached to the outlet end 38 of the connecting tube 26. The discharge or outlet end 44 of the quick connector 24 is selectively attachable to and detachable from the automobile air conditioning connector 14. The body 40 has a fluid passageway 46 extending between its ends 42, 44. The body 40 has a barbed connector portion 48 on the inlet end 42 with a portion of the passageway 46 passing therethrough. The tube 26 has an inner wall 50 defining a fluid passage 52 through the tube.

To connect the tube 26 to the body 40 so that the passageways 46 and 52 are connected, the outlet end 38 of the tube is slid over the outside surface 54 of the barbed connector portion 48 with the outlet end portion 55 of the inner wall 50 defining a portion of the passageway 52 in contact therewith. The outside surface 54 of of the barbed connector portion 48 has barbs 56 thereon.

The outside surface 54 is larger than the passageway 52 and the barbs 56 are even larger. The tube 26 is flexible and is deformed when it is moved over the barbed connector portion 48. In this assembled position, the tube 26 is frictionally attached by frictional force to the barbed connector portion 48. A securing ring 58 is then positioned around the outside 60 of the tube 26 to secure the tube and body 40 together. Accordingly, the passageways 46 and 52 are connected. It is within the contemplation of this invention to attach the tube 26 and body 40 in any known manner in which the fluid passageways 46 and 52 are connected.

The quick connector 24 of the present invention may be quickly and efficiently attached to and detached from the automotive connector 14 without the need for additional tools or manual twisting of the components of the quick connector. As shown in FIGS. 2 and 3, the body 40 of the quick connector 24 has locking tabs 62 formed integrally with the body 40. The locking tabs 62 are movable with respect to the body 40 to secure the quick connector 24 to the automotive connector 14 as will be hereinafter described.

The body 40 has an intermediate portion 64 and a connector end portion 66 extending from the intermediate portion toward the discharge or outlet end 44 of the body. The barbed connector portion 48 extends from the intermediate portion 64 towards and defines the inlet end 42 of the body 40.

The intermediate portion 64 of the body 40 has a generally circular outer peripheral surface 68 having inlet, intermediate and discharge raised portions 70, 72, and 74 respectively, as will be hereinafter more fully described. The inlet, intermediate and discharge raised portions 70, 72, 74 of the intermediate portion 64 have generally circular outer peripheral surfaces 76, 78, and 80 respectively having substantially the same predetermined diameter "Do".

The connector end portion 66 of the body 40 has a generally circular outer peripheral surface 81 coextensive with and extending away from the surface 80 of the discharge raised portion 74 of the intermediate portion 64. The generally circular outer peripheral surface 81 has substantially the same predetermined diameter "Do" and terminates in a raised stop portion 82 extending radially outwardly from the circular outer peripheral surface 81. The connector end portion 66 of the body 40 has a generally circular inner peripheral surface 84 extending from the inner end surface 86 of the intermediate portion 64 and having a predetermined diameter "Di" which is less than the diameter "Do".

The inner peripheral surface 84 of the connector end portion 66 terminates in an automotive connector receiving end portion 88. The connector receiving end portion 88 has an outer chamfer surface 90 extending at an angle radially outwardly from the inner peripheral surface 84 and terminates at a generally radial end surface 91 that extends radially outwardly from the outer chamfer surface 90.

The locking tabs 62 are provided to secure the quick connector 24 to the automotive connector 14. The locking tabs 62 have connector engaging lips 92 for selectively engaging and disengaging the automotive connector 14. The locking tabs 62 are formed integrally with the body 40 as a one piece part and have a hinge portion 94 extending from the intermediate portion 64. The locking tabs 62 also have an arm portion 96 extending from the hinge portion 94 to the connector engaging lips 92. The locking tabs 62 have a generally arcuate outer surface 98 formed about the predetermined diameter "Do" and a generally arcuate inner surface 100 formed about the predetermined diameter "Di". The side surfaces 102, 104, and end surface 106 of the locking tabs 62 extend between the inner and outer surfaces 100, 98 respectively.

The outer surfaces 76, 78, 80, 81, and 98 have a diameter "Do" and are in axial alignment and formed about the central axis 108. Likewise, the inner surfaces 86 and 100 having a diameter "Di" are in axial alignment and formed about the central axis 108.

Figure 6:
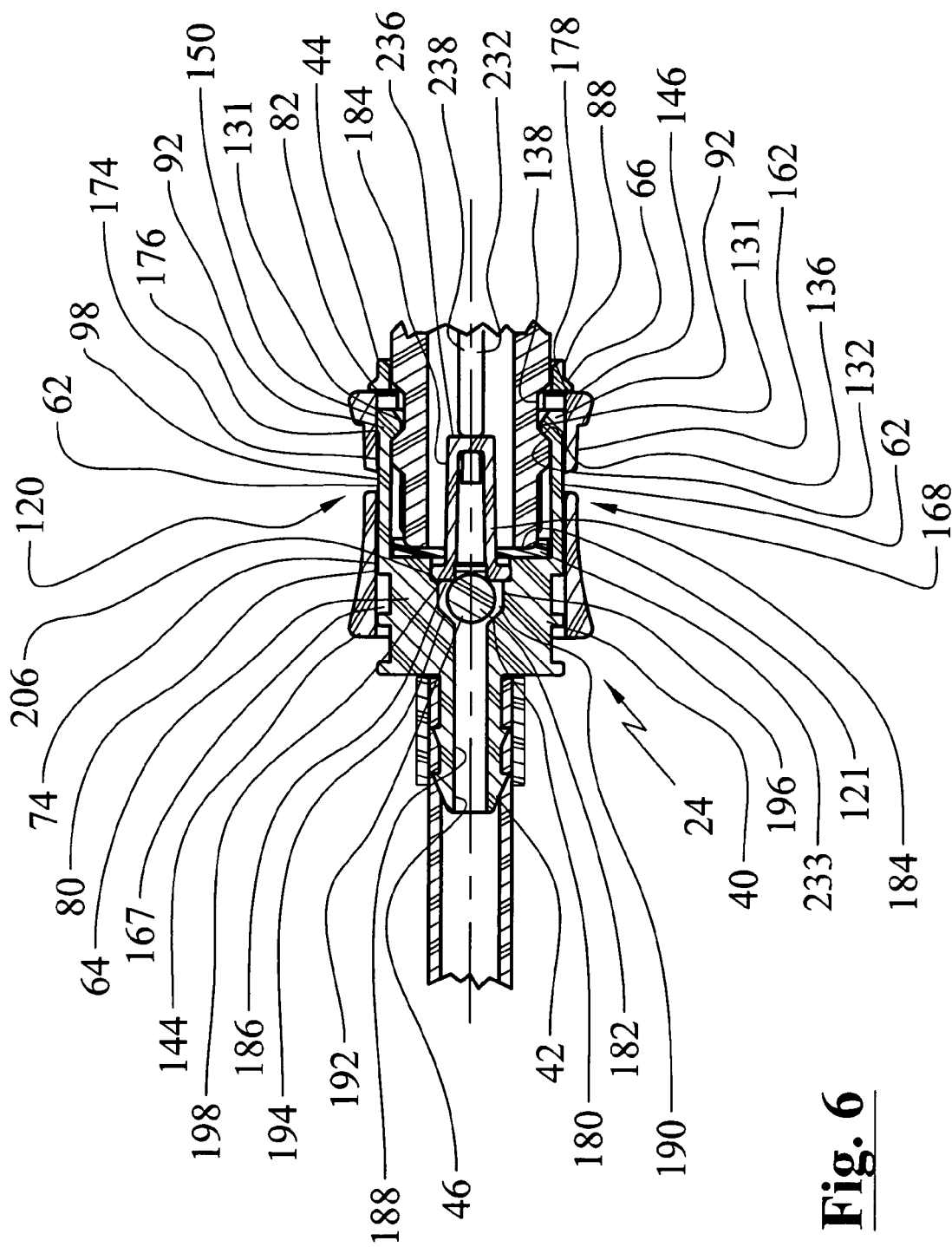
FIG. 6 is a sectional view of the quick connect fitting as shown in FIG. 5 with the quickconnect fitting locked to the recharge fitting.

The locking tabs 62 are movable with respect to the connector end portion 66 so they can move between a locked and an unlocked position. The locking tabs 62 are received in tab apertures 110 formed in the connector end portion 66. The tab apertures 110 have side surfaces 112, 114 and end surface 116 extending between the outer and inner surfaces, 76, 86 respectively. The side surfaces 112, 114 and end surface 116 of the tab apertures 110 are spaced from the side surfaces 102, 104, and end surface 106 of the locking tabs 62. When a force is exerted on the locking tabs 62, they are moveable between an unlocked position 118 shown in FIG. 3 and a locked position 120 as shown in FIG. 6.

To secure the quick connect fitting 24 to the automotive connector 14, the fitting and connector 24, 14 respectively, are aligned with each other with the inlet end 119 of the connector 14 adjacent the connector end portion 66 of the body 40 as shown in FIG. 3 and are then moved toward each other. The inlet end 119 of the connector 14 has an end sealing surface 121 and an end chamfer surface 122 extending radially outwardly at an angle from the end sealing surface 121 to the outer circumferential surface 124. The outer circumferential surface 124 has a diameter smaller than "Di" so that the surface 124 can slide into and adjacent to the inner peripheral surface 84 of the connector end portion 66. As the automotive connector 14 is moved toward the quick connect fitting 24, the chamfered surfaces 90, 122 may contact each other to guide the quick connect fitting 24 and the automotive connector 14 in alignment with each other.

Figure 4:
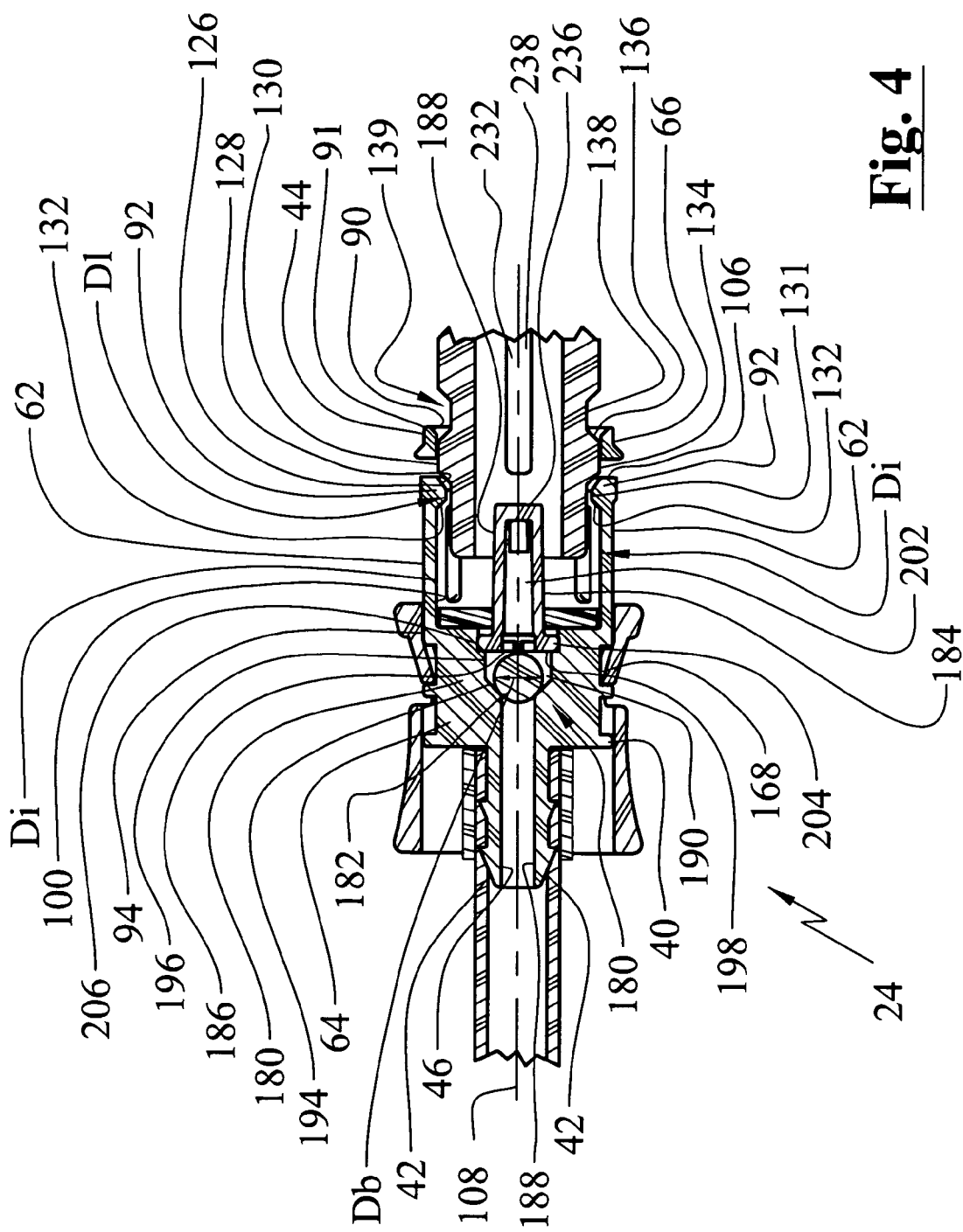
FIG. 4 is a sectional view of the quick connect fitting shown in FIG. 3 with the recharge fitting moved into the quick connect fitting but before engagement therewith.

As the quick connect fitting 24 and the automotive connector 14 are further moved together, the front chamfer surface 126 of the connector engaging lips 92 contacts the leading edge 128 of the automotive connector locking rim 130 as shown in FIG. 4. The connector engaging lips 92 extend generally radially inwardly of the arcuate inner surface 100 of the locking tabs 62 and the leading edge surface 128 extends at an angle radially inwardly and away from the end surface 106 of the locking tab and toward the inlet end 42 of the body 40. The leading edge surface 128 terminates at the bottom surface 131 of the connector engaging lips 92.

In an undeformed condition, the bottom arcuate surface 131 is arcuately formed about the central axis 108 with a diameter "Dl" which is less than the diameter "Di". The connector engaging lips 92 have a locking edge surface 132 extending radially from the bottom surface 131 at an angle thereto toward the inlet end 42 of the body 40. The locking edge surface 132 terminates at the arcuate inner surface 100 of the locking tabs 62.

As the quick connect fitting 24 and the automotive connector 14 are further moved together, the connector engaging lips 92 are moved radially outwardly by rotation about the hinge portion 94 of the locking tabs 62. This rotational movement is created by the camming action of the front chamfer surface 126 of the connector engaging lips 92 and the leading edge 128 of the automotive connector locking rim 130.

As the quick connect fitting 24 and the automotive connector 14 are further moved together, the bottom surface 131 of the connector engaging lips 92 slides along the top surface 134 of the automotive connector locking rim 130. The top surface 134 of the automotive connector locking rim 130 extends axially from the leading edge 128 and is generally circular and has a diameter slightly less than the diameter "Di" so that it can slide inside the connector end portion 66 of the quickconnector 24.

The automotive connector locking rim 130 has a retaining surface 136 extending from the top surface 134 at an angle radially inwardly away from the end sealing surface 121 and terminates at the bottom locking surface 138. The bottom locking surface 138 of the automotive connector 14 is generally circular and is formed about a diameter that is substantially equal to the diameter "Dl". The retaining surface 136 and bottom locking surface 138 form a depression 139 in the automotive connector 14 for receiving the connector engaging lips 92 therein.

Figure 5:
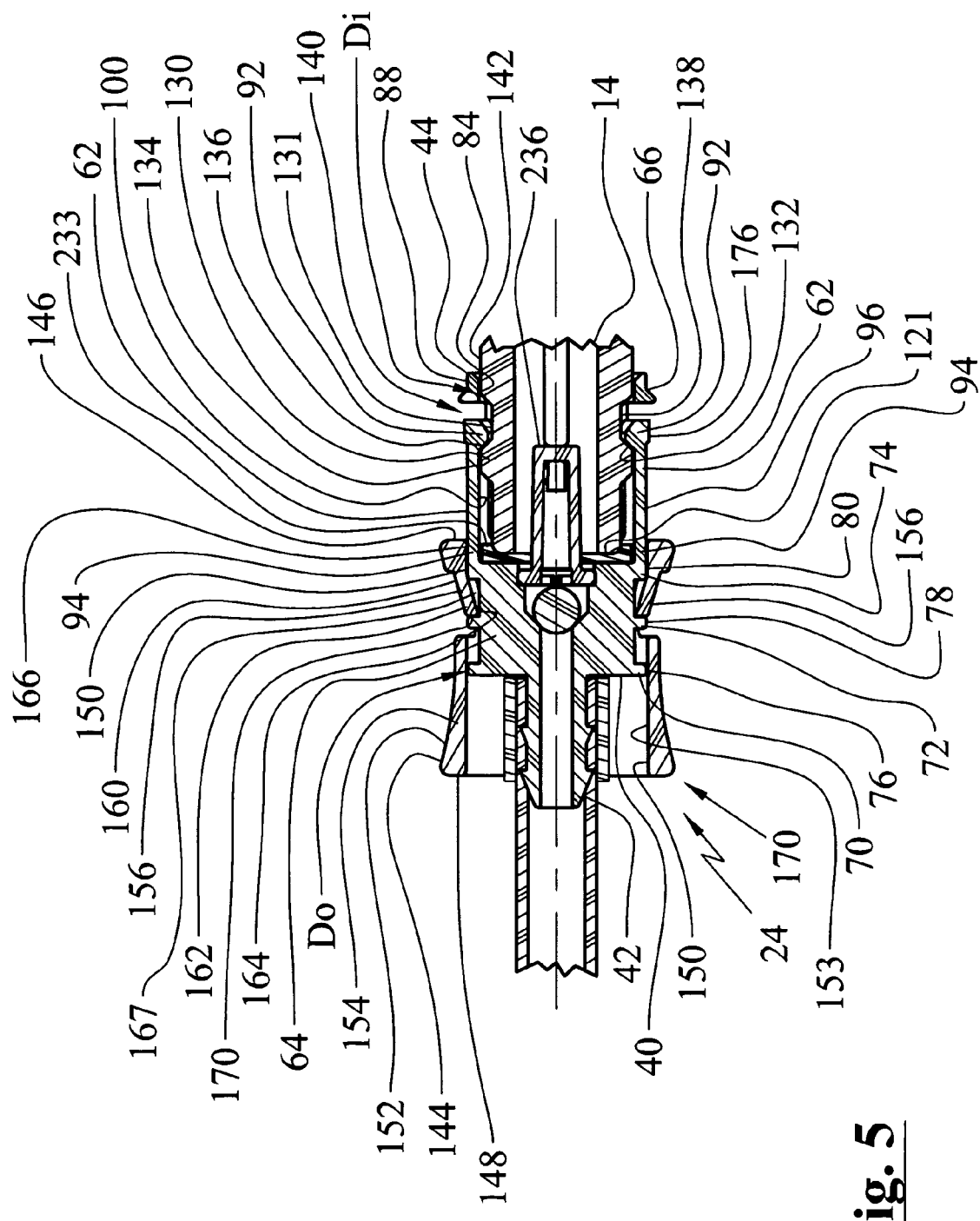
FIG. 5 is a sectional view of the quick connect fitting as shown in FIG. 4 with the quickconnect fitting in engagement with the recharge fitting.

As the quick connect fitting 24 and the automotive connector 14 are further moved together, the locking edge surface 132 of the connector engaging lips 92 slides along the retaining surface 136 of the automotive connector 14 so the locking tabs 62 move radially inwardly by rotation about the hinge portion 94 of the locking tabs 62, as shown in FIG. 5. This rotational movement is created by the camming action of the locking edge surface 132 and retaining surface 136 and the force of the locking tabs to return to their undeformed position.

FIG. 5 shows the locking tabs 62 securing the quick connect fitting 24 to the automotive connector 14. In this securing position 140, the bottom surface 131 of the connector engaging lips 92 is adjacent the bottom locking surface 138 of the automotive connector 14 and the arcuate inner surface 100 and locking edge surface 132 of the quick connector 24 are in contact with the top surface 134 and retaining surface 136 of the automotive connector 14 respectively. The automotive connector 14 is fluidically connected to the quick connector 24.

To maintain axial alignment of the quick connect fitting 24 and automotive connector 14, the connector has a stabilizing sleeve surface 142, spaced from the depression 139, which surface 142 is circular and has a diameter slightly smaller than diameter "Di". The stabilizing sleeve surface 142 is positioned so that when in the securing position 140, the sleeve surface 142 is in sliding contact with the inner peripheral surface 84 of the connector receiving end portion 88. According, radial movement of the quick connector 24 and the automotive connector 14 is restrained.

Figure 7:
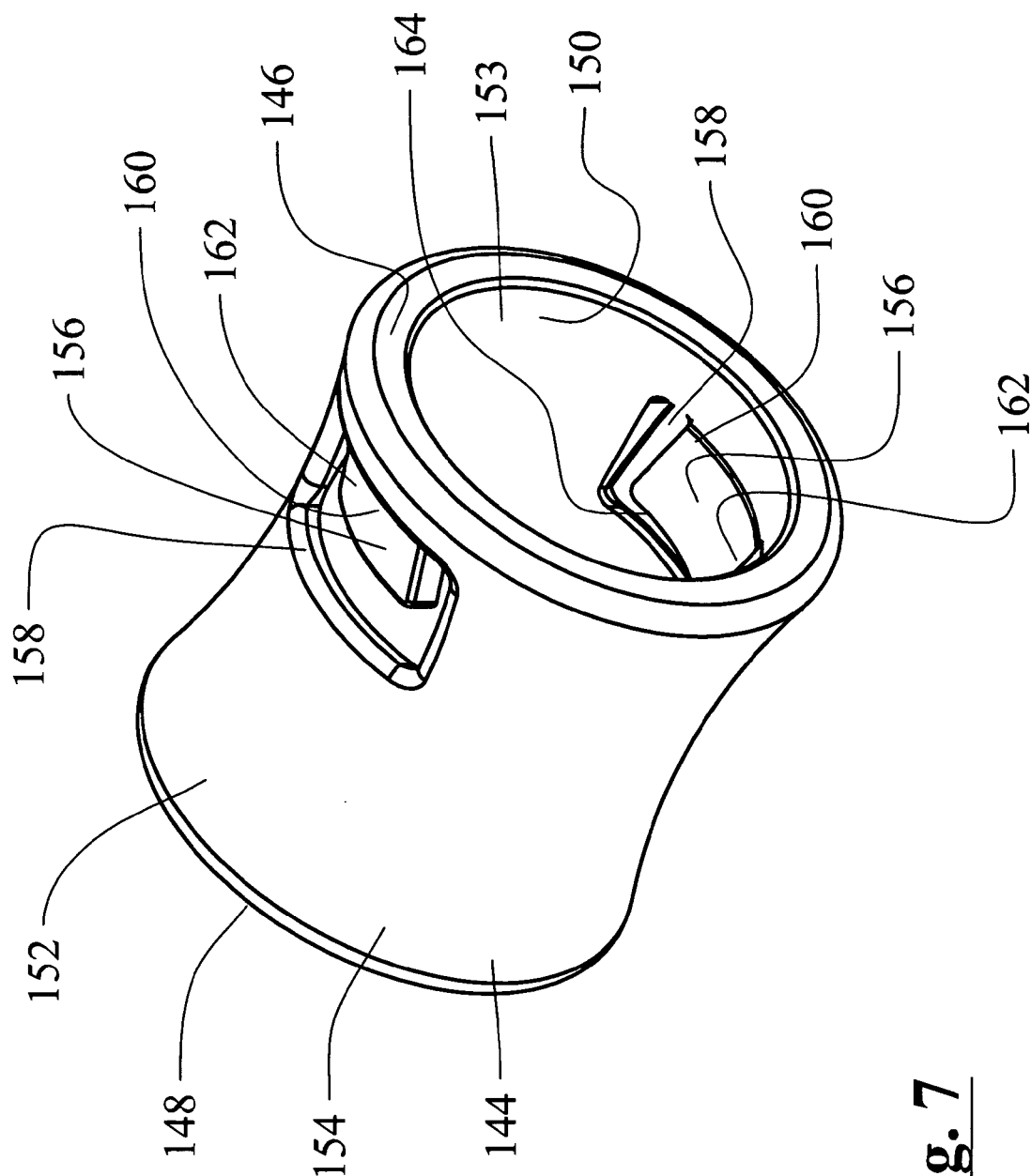
FIG. 7 is a perspective view of the locking sleeve of the quick connect fitting.

In order to selectively lock or unlock the quick connect fitting 24 of the present invention to the automotive connector 14, the quick connector 24 of the present invention provides a plastic locking sleeve 144 mountable on the plastic body 40 as shown in FIGS. 2, 5 and 7. The plastic locking sleeve 144 is generally cylindrical and has an assembly end 146 and an outer end 148 with an inner surface 150 and an outer surface 152 extending between the ends 146, 148. The inner surface 150 is generally circular and has a diameter slightly larger than the diameter "Do" of the outer peripheral surfaces 76, 78, 80 of the inlet, intermediate and discharge raised portions 70, 72, 74, respectively of the intermediate portion 64. The inner surface 150 is slidable along the outer peripheral surfaces 76, 78, 80 and forms the central aperture 153 of the locking sleeve. The outer surface 152 is concave to allow better gripping of the sleeve for manual movement thereof.

The quick connector 24 of the present invention provides for assembly of the sleeve 144 and body 40 of the quick connector by simply sliding them into an assembled relationship and when assembled, restrains the disassembly of the body and sleeve without additional separate components. To accomplish this feature, the locking sleeve 144 has a body 154 and assembly prongs 156 formed integrally with the locking sleeve body and movable with respect thereto.

The prongs 156 are positioned in apertures 158 in the locking sleeve body 154 and have a hinge portion 160 formed with the locking sleeve body 154. The hinge portion 160 is positioned toward the assembly end 146 and the prong legs 162 of the prongs 156 extend from the hinge portion at an angle away from the assembly end and generally radially inwardly of the inner surface 150 of the locking sleeve 144. The prong legs 162 have a body bearing surface 164 which in an undeformed state are radially inward of the inner surface 150 and axially spaced from the hinge portion 160 toward the outer end 148.

To assemble the sleeve 144 and body 40, the central aperture 153 of the sleeve 144 is positioned around the tube 26 before the tube and body 40 are assembled with the assembly end 146 positioned adjacent the inlet end 42 of the body. After the tube 26 and body 40 are assembled as described above, the sleeve 144 is moved toward the body 40 and assembled therewith. The body 40 has a prong engaging surface 166 including the outer peripheral surfaces 76, 78, 80 of the inlet, intermediate and discharge raised portions 70, 72, 74, respectively of the intermediate portion 64, and the outer peripheral surface 81 of the connector end portion 66 and outer surface 98 of the locking tabs 62 of the body 40.

During assembly, the body bearing surface 164 of the prong legs 162 contact and slide over the outer peripheral surface 76 of the inlet raised portion 70, and then contact and slide over the outer peripheral surface 76 of the intermediate raised portion 72. When the body bearing surface 164 of the prong legs 162 passes the outer peripheral surface 76, it moves into the depression 167 formed by the stop surface 170 extending radially inwardly from the surface 78. If any attempt is made to disassemble the locking sleeve 144 from the body 40, the body bearing surface 164 of the prong legs 162 contacts the stop surface 170 and resists disassembly of the locking sleeve and the body. Since the prong legs 162 are at an angle radially inward of the inner surface 150 and axially spaced from the hinge portion 160 toward the outer end 148 any attempt to disassemble the locking sleeve and the body meets with increased resistance.

The locking sleeve 144 is provided to lock the locking tabs 62 in the tab locking position or tab locked position 168 shown in FIG. 6. When the locking tabs 62 are in the secured position 140 shown in FIG. 5, the locking sleeve 144 is moved to the locked position 168 shown in FIG. 6 and locks the quick connector 24 to the automotive connector 14.

To position the sleeve 144 in the locked position 120, the sleeve 144 is moved from its tab unlocking position or tab unlocked position 170 shown in FIG. 5 to the locked position 168 shown in FIG. 6. As the sleeve moves toward the end portion 88 of the body 40, the inside surfaces 174 of the prong legs 162 contact the outer peripheral surface 80 of the discharge raised portion 74 and frictionally engages the outer peripheral surface. This frictional engagement holds the sleeve in any position on the body 40 if no force is exerted on the sleeve to allow manual attachment of the quick connector to the air conditioner connector with one hand.

The arm portion 96 of the locking tabs 62 has a raised portion 176 adjacent the connector engaging lips and extending radially outwardly of the outer surface 98 of the locking tabs. As the sleeve moves toward the end portion 88 of the body 40, the inside surface 150 of the locking sleeve contacts the raised portions 176 of the of the locking tabs 62 and forces the bottom surface 131 of the connector engaging lips 92 towards the bottom locking surface 138 of the automotive connector 14. In this position, the locking edge surface 132 of the quick connector 24 is in contact with the retaining surface 136 of the automotive connector 14 and resists radially inward movement of the connector engaging lips 92.

The assembly end 146 of the locking sleeve 144 contacts the stop surface 178 of the raised stop portion 82 extending radially outwardly from the circular outer peripheral surface 81 to resist further axial movement of the locking sleeve. In this position, movement of the sleeve 144 with respect to the body 40 is resisted by frictional forces and the quick connector 24 and automotive connector 14 are in the locked position 172. It should be understood that when the locking sleeve 144 is moved between the unlocked position 170 and the locked position 168 no twisting of the sleeve is required and the sleeve is moved between these positions by pushing or pulling on the sleeve.

When the quick connector 24 is so connected to the automotive connector 14 and the actuator 22 is connected to the pressurized container, the actuator may be actuated, allowing refrigerant to flow from the pressurized container 12, through the actuator 22, tube 26 and quick connector 24 and automotive fitting 14 into the automotive air conditioning system 16.

Figure 8:
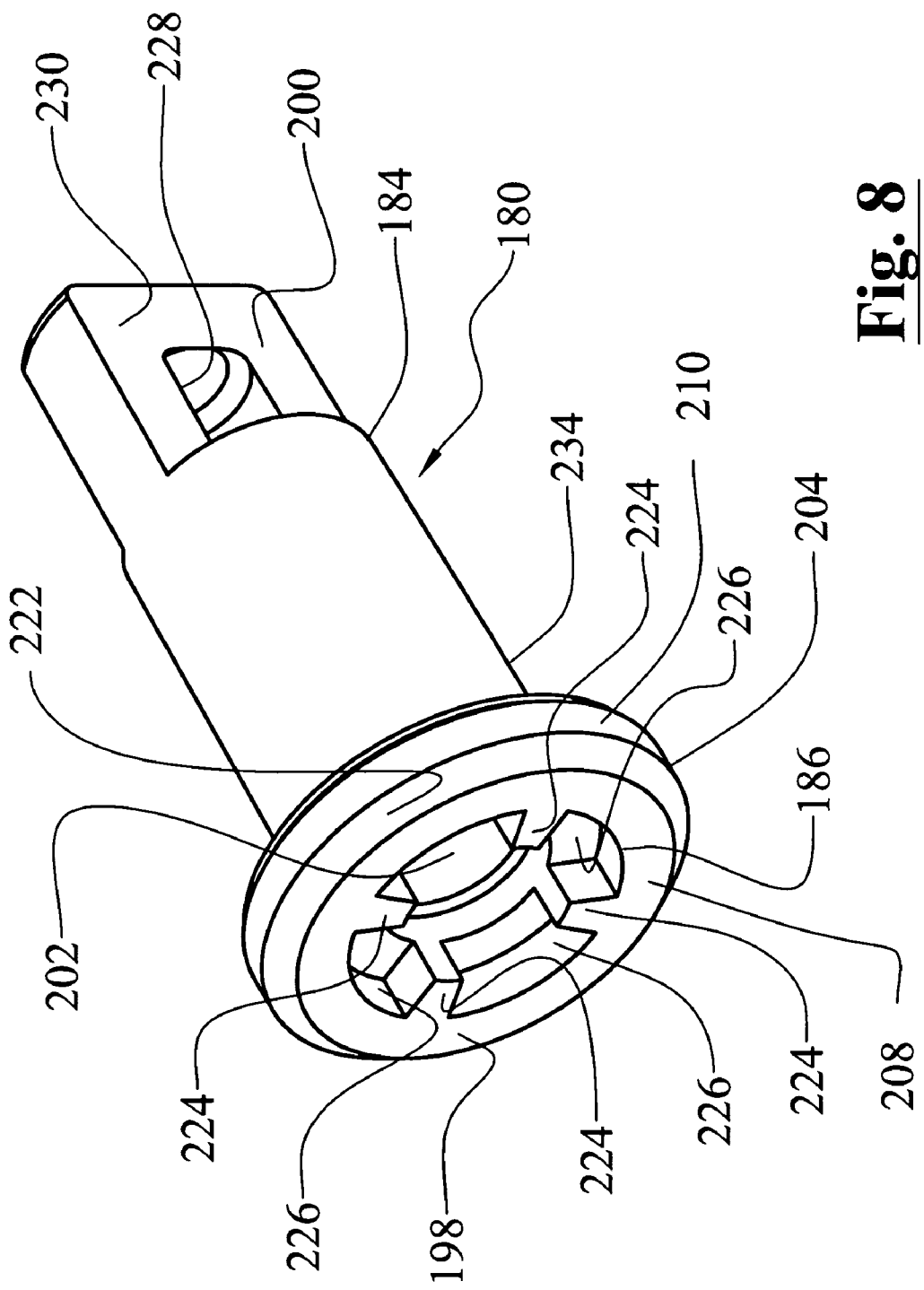
FIG. 8 is a perspective view of the stem of the quickconnect fitting.

In order to control the flow of refrigerant to and from the automotive air conditioning system, the quick connector 24 of the present invention provides a check valve 180 to allow flow of refrigerant into the automotive air conditioner but not allow refrigerant to flow or escape from the automotive air conditioner, as shown in FIGS. 4, 6, and 8. The check valve 180 of the present invention has a check valve ball 182 and a valve cage 184 having an inlet end 186 fluidically connected to the fluid passageway 46 of the plastic body 40. The fluid passageway 46 is defined by a wall 188 and extends through the inlet end 42 and into the intermediate portion 64 of the body 40.

The fluid passageway 46 has a chamber 190 for housing the check valve ball 182 of the check valve 180. The check valve ball 182 is spherical and has a predetermined outer diameter "Db". The chamber 190 includes a conical sealing surface 194 extending radially outwardly away from the wall 188 and terminates in an axial wall 196. The axial wall 196 is cylindrical in shape, having a diameter greater than the diameter "Db" and allows the ball to move therein. The wall 188 of the fluid passageway 46 is circular and has a diameter less than the outer diameter Db of the check valve ball 182. Accordingly, when fluid urges the ball 182 towards the conical sealing surface 194, such as when refrigerant attempts to escape the automotive air conditioning system 16 and the quick connector is attached thereto, the ball seals against the conical sealing surface and prevents the flow of refrigerant from the automotive air conditioner.

Figure 3A:
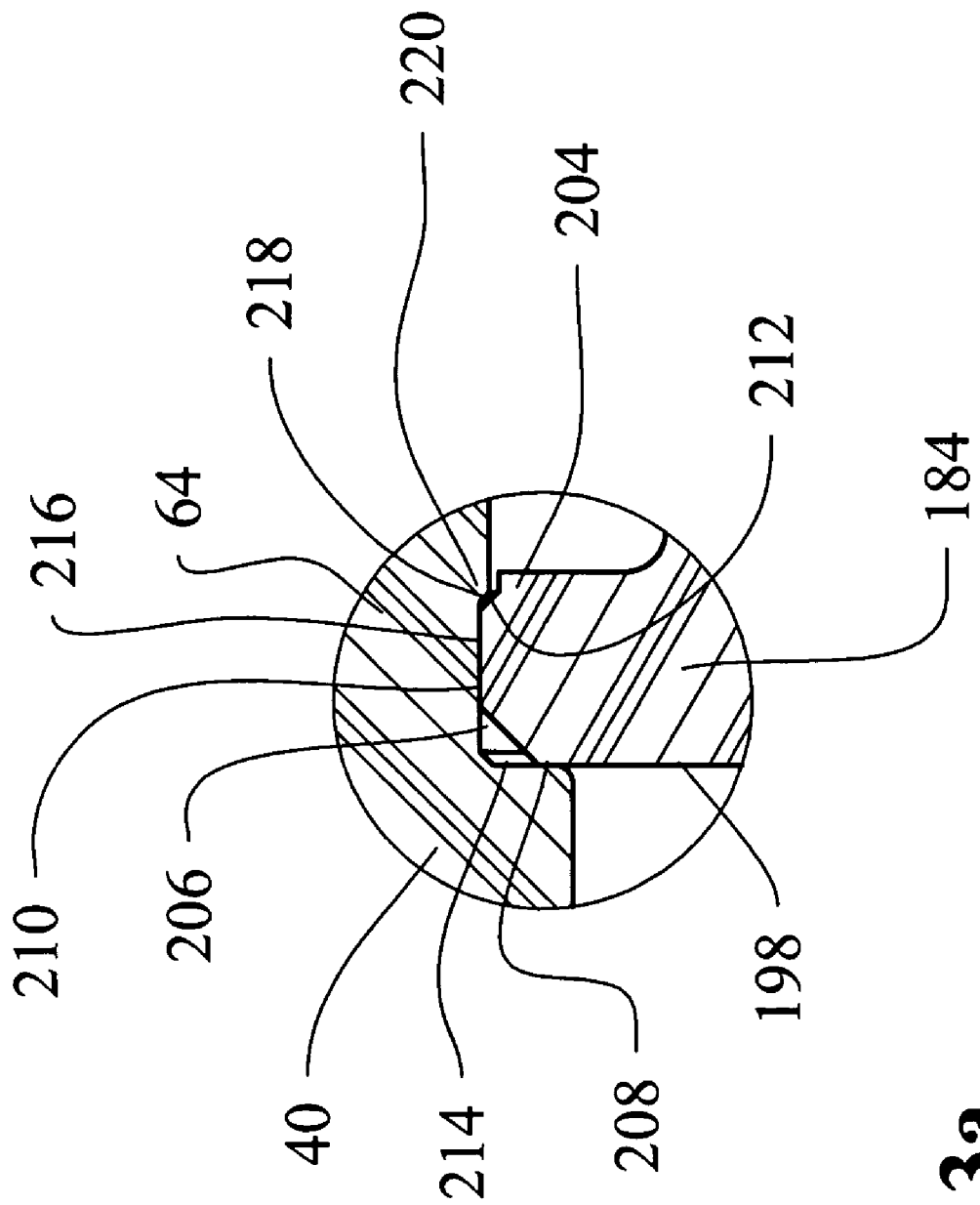
FIG. 3a is an enlarged view of the refrigerant material transfer device indicated by the circle 3a in FIG. 3.

The check valve 180 of the present invention has a valve cage 184 that snaps into engagement with the body 40 so that it is secured thereto without any separate fastening components. This design allows ready assembly of a valve cage 184 and its associated valve ball 182. The valve cage 184 has an inlet end 198, and an outlet end 200 with a valve cage fluid passageway 202 passing therethrough. The inlet end 198 has an enlarged body connecting portion 204 which is received by and secured in an integral pocket 206 formed integrally in the intermediate portion 64 of the quick connector. The body connecting portion 204 of the valve cage 184 has a back, side, and front surfaces 208, 210, 212 respectively. The pocket 206 in the body 40 is defined by a back, side and retaining surfaces, 214, 216 and 218 respectively, as shown in FIGS. 3a, 4 and 8.

To assemble the valve 180, the valve ball 182 is positioned in the chamber 190 and the body connecting portion 204 of the valve cage 184 is then positioned with its back side surface 208 adjacent the retaining portion 220 of the pocket 206. By exerting a force urging the body connecting portion 204 of the valve cage 184 into the pocket 206, the back surface 208 of the valve cage contacts the back surface 214 of the pocket, the side surface 210 of the valve cage contacts the side surface 216 of the pocket, and the front surface 212 of the valve cage contacts the retaining surface 218 of the pocket. The retaining surface 218 of the pocket 206 holds the valve cage 184 in the pocket 206 so that it is secured thereto without any separate fastening components.

The fluid passageway 202 of the valve cage 184 receives pressurized fluid from the passageway 46 of the body 40. When fluid is flowing towards the passageway 202, the ball 182 is urged towards the passageway 202.

The valve cage 184 of the present invention allows refrigerant to flow through the check valve even if the ball is resting against the valve cage and is designed to allow sufficient flow of refrigerant therethrough when transferring refrigerant from the refrigerant container to the automotive air conditioner. As shown in FIG. 8, the passageway 202 has ball valve holding portions 224 to hold the ball 182 so that fluid may flow into the passageway 202. Inlet depressions or non sealing passageways 226 are provided adjacent the ball valve holding portions 224 to allow fluid to flow around the ball and into the passageway 202 of the valve cage through the depressions 226. The passageway terminates in openings 228 in the sides 230 of the valve cage.

As shown in FIG. 3, the inlet end 119 of the automotive connector 14 has a fluid passageway 231 extending from its inlet end 119 to an automotive connector valve, indicated at 232, which is connected to the air conditioning system. The present invention provides a seal 233 positioned around the shank portion 234 of the valve cage and in contact with the inner end surface 86 of the intermediate portion 64. When the quick connector 24 is connected to the automotive air conditioning fitting 14 as shown in FIGS. 5 and 6, the end sealing surface 121 of the fitting 14 contacts and compresses the seal 233 to create a fluid seal between the quick connector 24 and the automotive fitting 14.

The valve cage 184 is also designed to activate the automotive connector valve 232 of the automotive air conditioning fitting 14 when the quick connector 24 is connected to the automotive air conditioning fitting. When the quick connector is not connected to the automotive air conditioning fitting, the automotive connector valve 232 stops the flow of refrigerant from the automotive air conditioning system. The valve cage has a valve actuation surface 236 that contacts and depresses the valve stem 238 of the automotive connector valve 232 when the quick connector 24 is connected to the automotive air conditioning fitting 14.

As shown in FIGS. 3 and 4, the valve stem is not depressed as the quick connector and automotive air conditioning fitting are not connected. In either the secured position 140 shown in FIG. 5 or the locked position 168 shown in FIG. 6, the valve stem 238 is depressed, connecting the fluid passageway 231 of the automotive fitting and the air conditioning system to the passageway 46 of the body 40 through the fluid passageway 202 of the valve cage 184.

If it is desired to detach the quick connector 24 from the automotive connector 14, the locking sleeve 144 is simply manually moved from the locked position 168 to the retracted or unlocked position 170 by overcoming the frictional force. The locking tabs 62 are then free to move and the quick connector 24 can be moved away from the automotive connector 14. During movement of the quick connector from the securing position 140 shown in FIG. 5 to the unlocked position 118 shown in FIG. 3, the locking tabs move in the reverse sequence as when they were moved from the unlocked position to the securing position 140 described above.

It is important to recognize that the body 40, locking sleeve 144, and valve cage 184 of the quick connector are designed to be manufactured in plastic material that "remembers" the configuration in which it is formed. This material memory allows for elastic deformation of the components by exerting a force thereon and the return of the material to its molded configuration. The locking tabs 62 and the prongs 156 may be deformed and exert a force to return to their molded position. This feature allows for designing the quick connector 24 of the present invention without requiring springs.

It is within the contemplation of this invention that the components of the quick connector be of a wide variety of constructions and designs. For example, where appropriate, the circular surfaces may have other configurations that match each other to coact as described herein. It should also be understood that it is within the contemplation of this invention that the quick connector of the present invention may be used to transfer other material, such as tire sealing material, and could be connected to various connectors.

Another embodiment of the material transfer device 10' of the present invention is shown in FIGS. 9–15 and is provided to transfer tire sealing material. The material transfer device 10' of the present invention is similar in construction with the material transfer device 10 described above. For ease of description, the material transfer device 10' is numbered with numerals the same as are used in connection with the material transfer device 10 to denote common or similar parts where appropriate and followed by a prime mark "'" to denote the material transfer device 10'.

The present invention provides an improved tire sealant material transfer device 10' for transferring tire sealant material from a pressurized container 12' to the tire valve connector 240 (shown in FIGS. 9–14) on a tire, such as the tire 242 shown on the automobile 18 in FIG. 1. It should be understood that the tire sealant material transfer device 10' of the present invention may be used with any tire. The tire has a valved connector 240 for inflating and/or introducing tire sealant material into the tire.

The tire sealant material transfer device 10' of the present invention provides for introducing tire sealant material into the tire. It should be understood that tire sealant material adheres to many things it comes in contact and it is desireable to minimize leakage of the tire sealant during its transfer into the tire and also when disconnecting the tire sealant material transfer device 10' from the tire valve 240.

The tire sealant material transfer device 10' of the present invention, shown in FIG. 1, provides an actuator 22' for attachment to the pressurized container, such as an aerosol can 12', having pressurized tire sealant material therein and a quick connect fitting 24' for attachment to the tire valve 240. A fluid conveying tube 26' is also provided to fluidically interconnect the actuator 22' and the quick connect fitting 24' to allow the flow of tire sealant material from the actuator to the quick connector 24'.

The actuator 22' is in fluid communication with the tire sealant material in the container 12' and has a valve 28' in a normally closed position in which the flow of tire sealant material from the container is blocked. The actuator 22' has a finger tab 30' which when depressed, moves the valve 28' to a discharge position so tire sealant material flows from the container 12' through the actuator to the connecting tube 26'. The tube 26' has an inlet end 32' in fluid communication with and attached to the actuator 22' by any known manner, such as the connector 36'. The outlet end 38' of the tube 26' is in fluid communication with and attached to the quick connect fitting 24' as will hereinafter described.

The quick connect fitting 24' has advantageous design features with fewer parts that are more readily assembled with cost savings and provide improved operational features. Further, the parts are particularly designed to be formed in plastic. One of the advantageous operational features provided by the quick connect fitting 24' of the present invention is the attachment of the quick connector 24' to the tire valve connector 240 quickly and efficiently without the need for additional tools or manual twisting of the connector components.

As seen in FIGS. 10–13, the quick connector 24' of the present invention provides a one-piece plastic body 40' that has an inlet end 42' attached to the outlet end 38' of the connecting tube 26'. The discharge or outlet end 44' of the quick connector 24' is selectively attachable to and detachable from the tire valve connector 240. The body 40' has a fluid passageway 46' extending between its ends 42', 44'. The body 40' has a barbed connector portion 48' on the inlet end 42' with a portion of the passageway 46' passing therethrough. The tube 26' has an inner wall 50' defining a fluid passage 52' through the tube.

To connect the tube 26' to the body 40' so that the passageways 46' and 52' are connected, the outlet end 38' of the tube is slid over the outside surface 54' of the barbed connector portion 48' with the outlet end portion 55' of the inner wall 50' defining a portion of the passageway 52' in contact therewith. The outside surface 54' of of the barbed connector portion 48' has barbs 56' thereon.

The outside surface 54' is larger than the passageway 52' and the barbs 56' are even larger. The tube 26' is flexible and is deformed when it is moved over the barbed connector portion 48'. In this assembled position, the tube 26' is frictionally attached by frictional force to the barbed connector portion 48'. A securing ring 58' is then positioned around the outside 60' of the tube 26' to secure the tube and body 40' together. Accordingly, the passageways 46' and 52' are connected. It is within the contemplation of this invention to attach the tube 26' and body 40' in any known manner in which the fluid passageways 46' and 52' are connected.

The quick connector 24' of the present invention may be quickly and efficiently attached to and detached from the tire valve connector 240 without the need for additional tools or manual twisting of the components of the quick connector. The body 40' of the quick connector 24' has locking tabs 62' formed integrally with the body 40'. The locking tabs 62' are movable with respect to the body 40' to secure the quick connector 24' to the tire valve connector 240 as will be hereinafter described.

The body 40' has an intermediate portion 64' and a connector end portion 66' extending from the intermediate portion toward the discharge or outlet end 44' of the body. The barbed connector portion 48' is part of the connector end portion 66' which extends from the intermediate portion 64' towards and defines the inlet end 42' of the body 40'.

The intermediate portion 64' of the body 40' has a generally circular outer peripheral surface 68' having a predetermined diameter Do'. The connector end portion 66' of the body 40' has a generally circular outer peripheral surface 81' having a diameter greater than Do' and extending away from the surface 68' of the intermediate portion 64'. The generally circular outer peripheral surface 81' has predetermined diameter that is greater than the diameter Do' and terminates in an end ring portion 244 which has a raised stop portion 82' extending radially outwardly from the circular outer peripheral surface 81'. The raised stop portion 82' is provided to contact the end 146' of the locking sleeve 144' to limit relative movement of the body and the locking sleeve in one direction.

The connector end portion 66' of the body 40' has a generally circular inner peripheral surface 84' extending from the inner end surface 86' of the intermediate portion 64'.

The inner peripheral surface 84' of the connector end portion 66' terminates in a tire connector receiving end portion 88'. The tire connector receiving end portion 88' has an outer chamfer surface 90' extending at an angle radially outwardly from the inner peripheral surface 84' and terminates at a generally radial end surface 91' that extends radially outwardly from the outer chamfer surface 90'.

The locking tabs 62' are provided to secure the quick connector 24' to the tire valve connector 240. As seen in FIG. 10, the locking tabs 62' have connector engaging lips 92' for selectively engaging and disengaging the tire valve connector 240. The locking tabs 62' are formed integrally with the body 40' as a one piece part and have a hinge portion 94' and an arm portion 96' extending from the hinge portion 94' to the connector engaging lips 92'. The locking tabs 62' have a generally arcuate outer surface 98' and a generally arcuate inner surface 100'. The side surfaces 102', 104', and end surface 106' of the locking tabs 62' extend between the inner and outer surfaces 100', 98' of the lips respectively. While the embodiment shown in FIGS. 9–15 disclose two locking tabs 62', it is also within the contemplation of this invention to use one or more than two locking tabs 62'.

Figure 14:
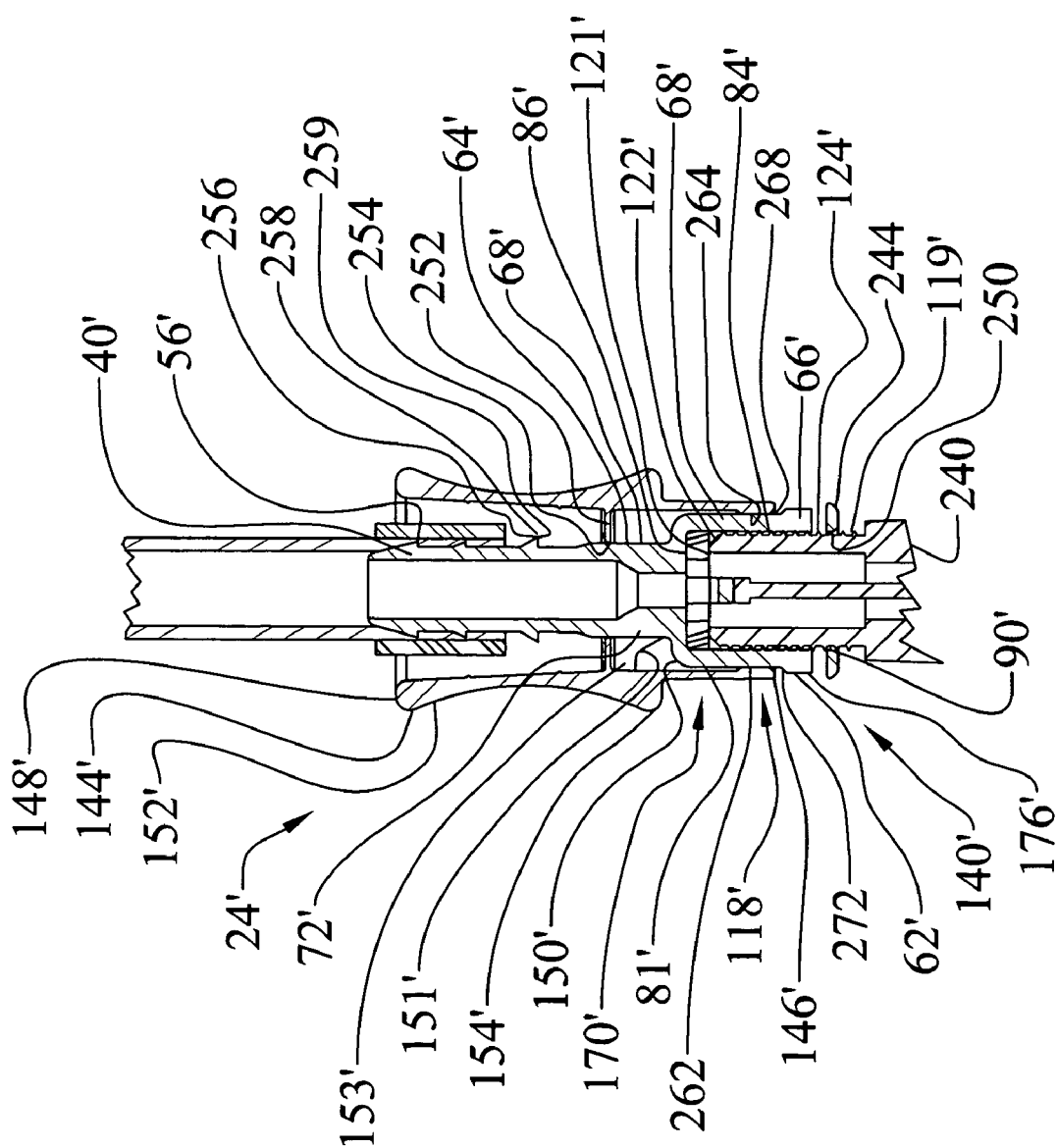
FIG. 14 is a sectional view of the quick connect fitting shown in FIG. 12 taken along line 14—14 thereof and with a portion of a tire valve connector.
Figure 15:
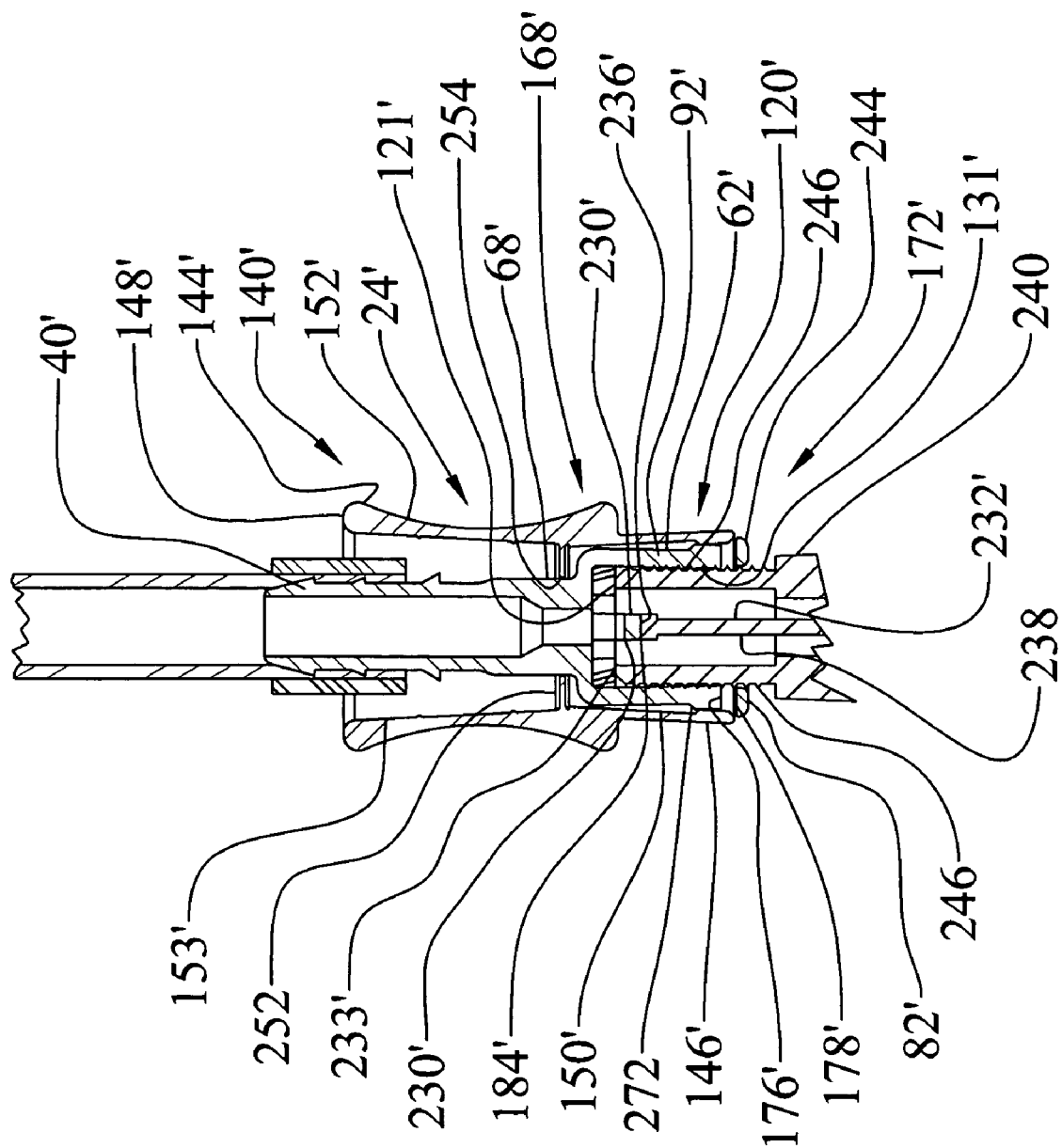
FIG. 15 is a sectional view of the quick connect fitting shown in FIG. 14 with the quickconnect fitting locked to the tire valve connector.

The locking tabs 62' are movable with respect to the connector end portion 66' so they can move between a locked and an unlocked position. The locking tabs 62' are received in tab apertures 110' formed in the connector end portion 66'. The tab apertures 110' have side surfaces 112', 114' and end surface 116' extending between the outer and inner surfaces, 98', 100' respectively. The side surfaces 112', 114' and end surface 116' of the tab apertures 110' are spaced from the side surfaces 102', 104', and end surface 106' of the locking tabs 62'. When a force is exerted on the locking tabs 62', they are moveable between an unlocked position 118' shown in FIG. 14 and a locked position 120' as shown in FIG. 15, as will be more fully described.

Figure 9:
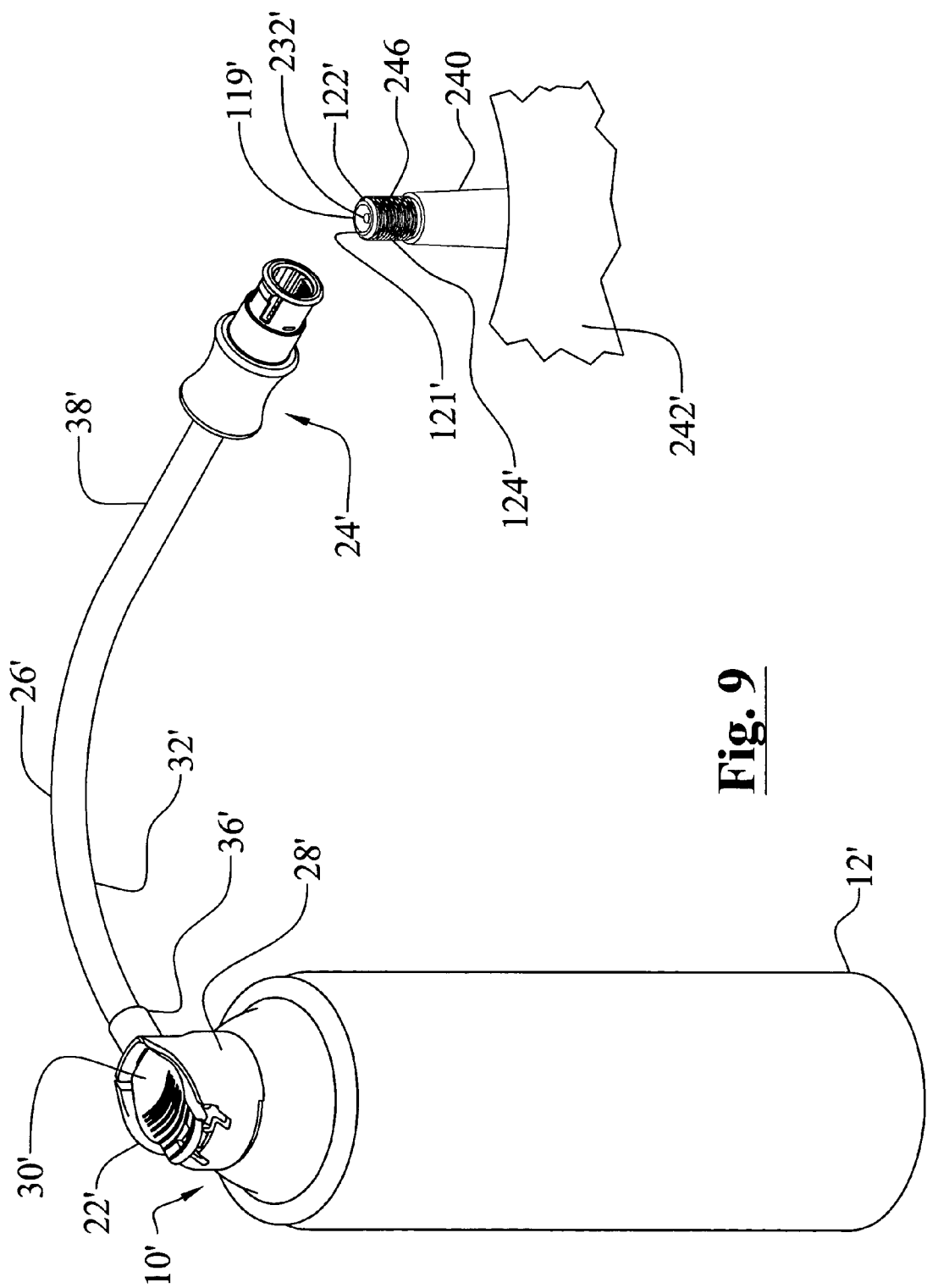
FIG. 9 is a schematic view of a tire sealant material transfer device for interconnecting a pressurized canister to the tire valve connector with the quick connector of the tire sealant material transfer device.

To secure the quick connect fitting 24' to the tire valve connector 240, the quick connect fitting and tire valve connector 24', 240 respectively, are aligned with each other with the inlet end 119' of the connector 240 adjacent the connector end portion 66' of the body 40' and are then moved toward each other. As shown in FIGS. 9, 14 and 15, the inlet end 119' of the connector 240 has an end sealing surface 121' and an end chamfer surface 122' extending radially outwardly at an angle from the end sealing surface 121' to the outer circumferential surface 124' of the tire connector. The outer circumferential surface 124' has a diameter smaller than the diameter of the inner peripheral surface 84' of the connector end portion 66' so that the surface 124' can slide therein. The outer circumferential surface 124' of the tire valve 240 has threads 246 forming the surface 124'.

As the automotive connector 240 is moved toward the quick connect fitting 24', the chamfered surfaces 90', 122' may contact each other to guide the quick connect fitting 24' and the automotive connector 240 into alignment with each other.

As the quick connect fitting 24' and the tire valve connector 240 are further moved together, the threads 246 are positioned adjacent the bottom surface 131' of the connector engaging lips 92'. The bottom surface 131' has an arcuate shape about the same axis and having the same diameter as the circular inner peripheral surface 84' of the connector end portion 66'. The bottom surface 131' of the lips 92' have protrusions 248 thereon for engaging the threads 246 when the quickconnect fitting 24' is in the locked position 120'. The protrusions 248 are formed in the lips 92' in a direction about the circumference thereof so they generally align with the threads 246 when positioned in the locked position 120'.

As the quick connect fitting 24' and the automotive connector 240 are further moved together, the bottom surface 131' of the connector engaging lips 92' slides along the threads 246 of the automotive connector 240.

FIG. 14 shows the locking tabs 62' securing the quick connect fitting 24 to the automotive connector 240. In this securing position 140', the bottom surface 131' of the connector engaging lips 92' is adjacent and in contact with the threads 246 of the automotive connector 240 and the inner peripheral surface 84' of the connector end portion 66' is adjacent and in contact with the threads 246.

Figure 12:
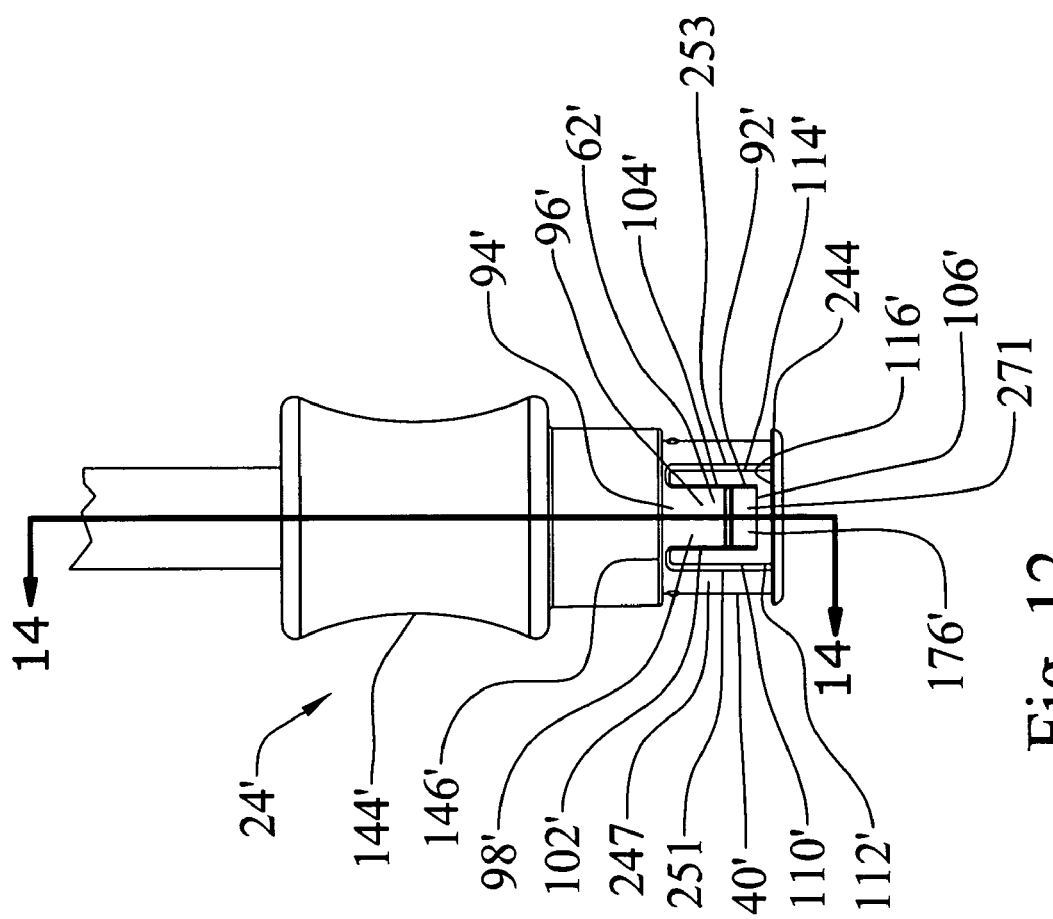
FIG. 12 is a side view of the quick connect fitting shown in FIG. 10.
Figure 13:
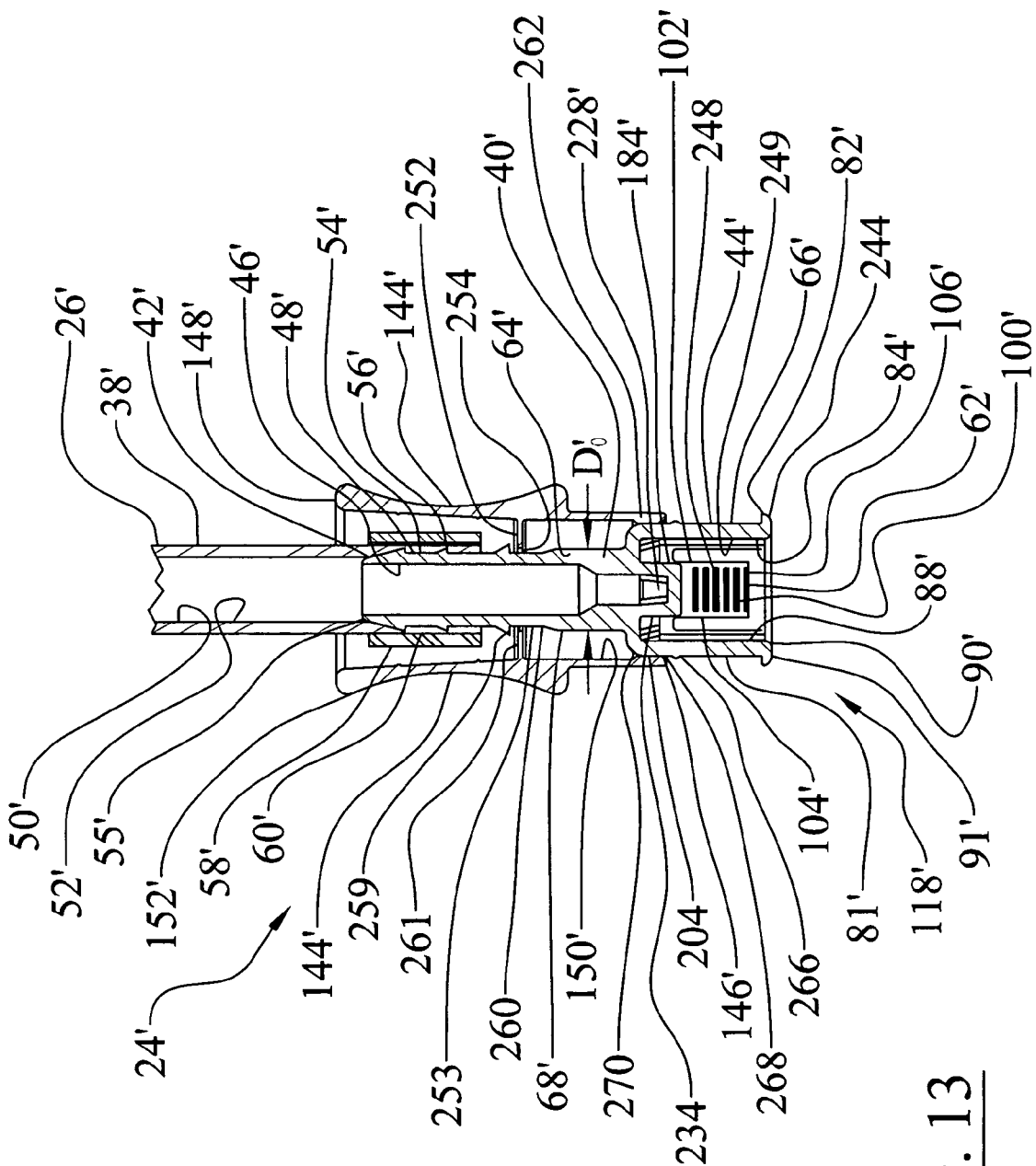
FIG. 13 is a sectional view of the quick connect fitting shown in FIG. 11 taken along line 13—13 thereof.

The inner peripheral surface 84' is an integral part of the sleeve and improves the stability of the connection between the connector 24' and the tire valve when in the locked position. While the locking tabs 62' are moveable with respect to the inner surface 84' of the sleeve, the inner peripheral surface 84' between the tabs 62' and the inner peripheral surface 84' of the ring portion 244 are not moveable with respect thereto. The inner peripheral surface 84' between the tabs 62' is the defined by the inner surface 249 of the stabilizing portion 247 as shown in FIGS. 12 and 13.

The stabilizing portion 247 of the body 40' extends between the side surfaces 112', 114' of the tab apertures 110' formed in the connector end portion 66'. The stabilizing portion 247 of the body 40' has side portions 251, 253 forming the side surfaces 112', 114', respectively, of the tab apertures 110'. The side portions 251 and 253 are adjacent to and spaced from the locking tabs 62'. The stabilizing portions 247 and consequently their side portions 251 are formed integrally with the end ring portion 244. The end ring portion 244 has the end surface 116' which defines a portion of the apertures 110' for receiving the locking tabs therein.

Accordingly, when in the locked position 120', the inner surface 249 of the stabilizing portion 247 and the inner peripheral surface 84' of the ring portion 244 provide an improved connection between the tire valve and the connector 24' of the present invention. For example, if external forces are exerted to misalign the tire valve and the connector 24', the inner surface 249 and the inner peripheral surface 84' of the ring portion 244 in contact with the tire valve would resist that force and tend to maintain alignment thereof. In the locked position, the automotive connector 240 is fluidically connected to the quick connector 24' as will be further described.

To maintain axial alignment of the quick connect fitting 24' and automotive connector 240, the end ring portion 244 has a circular inner surface 250, of substantially the same diameter as the threads 246, which defines a portion of the inner peripheral surface 84' and is in contact with the threads 246. When in the locked position, the inner surface 250 of the end ring contacts the threads and assists in maintaining alignment of the fitting 24' and the tire valve 240. This assists in maintaining a connection therebetween to minimize leakage of the tire sealant material as it flows into the tire and also assists in providing a quick and aligned disconnection of the fitting and tire valve to minimize leakage of the tire sealant during disconnection thereof.

In order to selectively lock or unlock the quick connect fitting 24' of the present invention to the automotive connector 240, the quick connector 24' of the present invention provides a plastic locking sleeve 144' mountable on the plastic body 40' as shown in FIGS. 13–15. The plastic locking sleeve 144' is generally cylindrical and has an assembly end 146' and an outer end 148' with an inner surface 150' and an outer surface 152' extending between the ends 146', 148'. The inner surface 150' is generally circular and is slidable along the plastic body 40'.

The locking sleeve 144' has assembly prongs or flexible portions 252 extending radially inwardly of the inner surface 150'. The assembly prongs or flexible portions 252 have inner bearing surfaces 254 for contacting the outer surface 81' of the body 40' and supporting the locking sleeve 144' on the body 40'. The inner bearing surfaces 254 of the prongs 252 are formed to slide along the outer peripheral surface 68' of the intermediate portion 64' body 40'. The inner surface 150' and the inner bearing surfaces 254 form the central aperture 153' of the locking sleeve. The outer surface 152' has a concave portion to allow better gripping of the sleeve for manual movement thereof.

The quick connector 24' of the present invention provides for assembly of the sleeve 144' and body 40' of the quick connector by simply sliding them into an assembled relationship and when assembled, restrains the disassembly of the body and sleeve without additional separate components. To accomplish this feature, the locking sleeve 144' has a locking sleeve body 154' and assembly prongs 252 formed as part of and integrally with the locking sleeve body and movable along the body 40'.

To assemble the sleeve 144' and body 40', the central aperture 153' of the sleeve 144' is positioned around the body 40' before the tube 26' and body 40' are assembled. To start the assembly of the sleeve and the body, the assembly end 146' of the sleeve is positioned adjacent the inlet end 42' of the body. The sleeve 144' is then moved toward the body 40' and the bearing surface 254 of the assembly prongs 252 contact and slide over the barbs 56'.

The inner enlarged barb 256 has an outer surface 258 that has a circumference greater than the circumference of the body bearing surface 254. The prong legs 252 contact the inner barb 256 and flex to slide over the inner barb 256. After the prong legs are past the barb 256, if any attempt is made to disassemble the locking sleeve 144' from the body 40', the body bearing surface 254 of the prong legs 252 contacts the barb 256 and resists disassembly of the locking sleeve and the body. In this position, the barb 256 restrains disassembly of the body 40' and the sleeve 144' since the generally radial inner stop surface 259 of the inner barb 256 contacts the side surface 261 of the legs 252 when disassembly is attempted. The inner surface 150' of the sleeve slidably receives the outer surface 68' of the connector end portion 66' of the body.

The body 40' has a necked down portion 260 between the barb 256 and the intermediate portion 72' of the body 40'. The necked down portion 260 has a prong engaging surface 253 has a circumference less than the circumference of the bearing surface 254 of the prong legs 252 and accordingly allows the sleeve to be easily moved towards the outlet end 44'. The outlet end 38' of the tube 26' is then assembled with the body 40' by sliding the tube over the barbs 56' and up to the inner enlarged barb 256. The securing ring 58' is then positioned around the outlet end 38' of the tube to keep the barbs in engagement with the tube.

The outside surface 81' has locking protrusions 266 thereon extending outwardly towards the inner surface 150' of the sleeve as seen in FIGS. 10 and 13. As the sleeve is moved towards the locking protrusion, the leading edge 268 of the raised portions 262 of the sleeve contacts the locking protrusions 266 and the bearing surface of the raised portions slide over the locking protrusions until they are past the trailing edge 270 of the raised portions. In this position, the locking protrusions restrain movement of the locking sleeve away from the connector end portion 66' of the body when the protrusions 266 contact the trailing edge 270 of the sleeve.

In this position, the quick connector 24' of the present invention is assembled and ready to be connected to the tire valve 240. To start this assembly process, the inlet end 119' of the tire valve is positioned in alignment with the connector end portion 66' and its inner peripheral surface 84'. The inlet end 119' is then moved toward the body 40' so that the threads 246 are received in the connector end portion and the end sealing surface 121' of the inlet end 119' of the tire valve is sealed against the body and the tire valve is opened as will hereinafter be more fully described.

The locking sleeve 144' is provided to lock the locking tabs 62' in the tab locking position or tab locked position 168' shown in FIG. 15. When the locking tabs 62' are in the secured position 140' shown in FIG. 14, the locking sleeve 144' is moved to the locked position 168' and locks the quick connector 24' to the automotive connector 240'.

To position the sleeve 144' in the locked position 168', the sleeve 144' is moved from its tab unlocking position or tab unlocked position 170', shown in FIG. 14, to the locked position 168' shown in FIG. 15. As the sleeve moves toward the connector receiving end portion 66' of the body 40', the bearing surface 254 of the prong legs 252 slides along the outer surface 68' of the intermediate portion 64' of the body 40'. During this movement of the sleeve, the inner surface 150' of the sleeve has raised portions 262 extending radially inwardly toward the outer surface 81' of the connector end portion 66' of the body and terminate in an inner bearing surface 264 which contacts the outside surface 81' of the connector receiving end portion 66'.

As seen in FIGS. 10, 12 and 14, the arm portion 96' of the locking tabs 62' has a raised portion 176' adjacent the connector engaging lips and extending radially outwardly of the outer surface 98' of the locking tabs to an outer arcuate surface 271. As the sleeve moves toward the end portion 88' of the body 40', the leading edge 268 of the raised portions 262 contacts the leading edge 272 of the raised portion 176'. The diameter of the inner bearing surface 264 of the sleeve is less than the diameter of the outer arcuate surface 271 of the raised portions on the locking tabs. As movement of the sleeve towards the end portion 88', the inner bearing surface 264 of the sleeve exerts a force on the outer arcuate surface 271 of the locking tabs and consequently forces the protrusions 248 on the inner surface 100' of the locking tabs toward the threads 246 of the tire valve 240. This force is sufficient to deform the protrusions 248 against the threads 246 and securely attach the quick connect fitting 24' to the tire valve 240.

As seen in FIG. 15, when the sleeve is in the locking position 168', the assembly end 146' of the locking sleeve 144' contacts the stop surface 178' of the raised stop portion 82' of the ring portion 244 to resist further axial movement of the locking sleeve. In this position, further movement of the sleeve 144' with respect to the body 40' is resisted by contact between the stop surface 178' and the leading edge 268 and the quick connector 24' and automotive connector 240 are in the locked position 172'. It should be understood that when the locking sleeve 144' is moved between the unlocked position 170' and the locked position 168' no twisting of the sleeve is required and the sleeve is moved between these positions by pushing or pulling on the sleeve.

The quick connector 24' can be connected to the tire valve 240 with one hand. By simply holding the connector with one hand, sliding it into the secured position and then sliding the locking sleeve into the locking position, the locked connection of the connector and the tire valve is achieved. Likewise, disconnection of the quick connector and the tire valve is accomplished by the reverse steps taken to make the connection. In addition, in cold weather when a motorist is wearing gloves, the motorists gloves need not be removed to make the desired connection or disconnection.

When the quick connector 24' is so connected to the automotive connector 240 and the actuator 22' is connected to the pressurized container, the actuator may be actuated, allowing tire sealant to flow from the pressurized container 12', through the actuator 22', tube 26' and quick connector 24' and automotive fitting 240 into the tire.

While it is within the contemplation of this invention to provide a check valve 180, as described above in connection with the connector 24, for use with the connector 24', preferably a check valve is not provided. The container 12' contains inflator and sealant composition under pressure and usually the tire has little or no pressurized material. Accordingly, in this embodiment while a check valve is not preferred, the connector 24' could function with a check valve.

In order to open the tire valve, the body 40' has a cage portion 184' similar in construction to a portion of the valve cage 184 yet formed integrally with the body 40' and without a check valve ball in place, as seen in FIGS. 13 and 15. By forming the cage portion integrally with the body, the assembly of the body, cage and the check valve ball is avoided resulting in cost savings. The fluid passageway 46' extends through the intermediate portion of the body to the cage portion 184'. The passageway 46' extends through openings 228' in the sides 230' of the cage portion.

The cage portion is provided to open the automotive connector valve 232' of the tire valve 240 when the quick connector 24' is connected to the tire valve. When the quick connector is not connected to the tire valve, the tire valve is in the closed position and stops pressure from being released therethrough. The cage portion 184' has a valve actuation surface 236' that contacts and depresses the valve stem 238' of the tire valve 240 when the quick connector 24' is connected to the tire valve.

The valve stem is 238' is not depressed when the quick connector and tire valve fitting are not connected. In either the secured position 140' shown in FIG. 14 or the locked position 168' shown in FIG. 15, the valve stem 238' is depressed, connecting the fluid passageway of the tire valve to the passageway 46' of the body 40".

If it is desired to detach the quick connector 24' from the automotive connector 240, the locking sleeve 144' is simply manually moved from the locked position 168' to the retracted or unlocked position 170' by overcoming the frictional force. The locking tabs 62' are then free to move and the quick connector 24' can be moved away from the tire valve. During movement of the quick connector from the locked position 168' to release the tire valve, the locking tabs move in the reverse sequence as when they were moved from the unlocked position to the locked position described above.

The present invention provides a seal 233' positioned around the shank portion 234' of the cage portion 184' and in contact with the inner end surface 86' of the intermediate portion 64'. When the quick connector 24' is connected to the tire valve connector fitting 240 as shown in FIG. 15, the end sealing surface 121' of the fitting 240 contacts and compresses the seal 233' to create a fluid seal between the quick connector 24' and the automotive fitting 240.

It is important to recognize that the body 40', and locking sleeve 144' of the quick connector are designed to be manufactured in plastic material that "remembers" the configuration in which it is formed. This material memory allows for elastic deformation of the components by exerting a force thereon and the return of the material to its molded configuration. The locking tabs 62' and the prongs 256 may be deformed and exert a force to return to their molded position. This feature allows for designing the quick connector 24' of the present invention without requiring springs.

The invention has been described with reference to the preferred embodiments. Obviously, modifications and alterations will occur to others upon reading and understanding the specification. It is our intention to include all modifications and alterations in so far as they are within the scope of the appended claims or equivalents thereof.

What is claimed is:

1. A material transfer device for transferring material from a pressurized container to another connector including:
   a quick connect fitting for fluidically connecting to the connector, said quick connect fitting having
   a one piece plastic body having one end for receiving material from the pressurized container and another end selectively attachable to and detachable from the connector, said plastic body having a fluid passageway extending from said one end to said other end and,
   a plastic locking sleeve mounted on said plastic body for selectively locking and unlocking said body to the connector,
   one of said body and said locking sleeve having at least one locking tab integrally formed therewith, said one locking tab having a hinge portion and a connector engaging lip pivotal about said hinge portion and engagable with the connector, said one locking tab moveable between a secured position in which said connector engaging lip is engageable by the connector and an unlocked position, said body and said locking sleeve movable with respect to each other between a tab unlocking position and a tab locking position to lock said locking tabs in said secured position.

2. A material transfer device as described in claim 1 in which the other of said body and said locking sleeve contacts said one locking tab in said tab locking position to lock said locking tabs in said secured position.

3. A quick connect material transfer device for attaching a container having tire sealant material to the valve of a tire for transferring tire sealant material from a pressurized container to the valve of a tire including:
   an actuator adapted for attachment to the pressurized container for selectively receiving tire sealant material from the pressurized container,
   a quick connect fitting fluidically connectable to the to the tire valve,
   a fluid conveying tube fluidically connecting said fitting and said actuator to allow the flow of tire sealant material from said actuator to said quick connect fitting,
   said quick connect fitting having
   a one piece plastic body having one end attached to said tube and another end selectively attachable to and detachable from the tire valve, said plastic body having a fluid passageway extending from said one end attached to said fluid conveying tube to said other end for fluidically connecting to the tire valve and,
   a plastic locking sleeve mounted on said plastic body for selectively locking and unlocking said body to the tire valve, one of said body and said locking sleeve having at least one locking tab integrally formed therewith, said one locking tab having a hinge portion and a connector engaging lip pivotal about said hinge portion and engagable with the tire valve, said one of said body and said locking sleeve has at least one aperture therein for receiving said one locking tab therein, said one locking tab moveable between a secured position in which said connector engaging lip is engageable by the tire valve and an unlocked position, said body and said locking sleeve movable with respect to each other between a tab unlocking position and a tab locking position to lock said locking tabs in said secured position.

4. A quick connect material transfer device as described in claim 3 having an end ring portion which has an outer stop portion for contacting the other of said body and said locking sleeve to limit relative movement of said body and said locking sleeve in one direction.

5. A quick connect material transfer device as described in claim 3 in which said one of said body and said locking sleeve has a stabilizing portion adjacent said connector engaging lip and defining a portion of said aperture for receiving said one locking tab therein.

6. A quick connect material transfer device as described in claim 5 in which said stabilizing portion has an end ring portion defining a portion of said aperture for receiving said one locking tab therein and defining one end of said one of said body and said locking sleeve.

7. A quick connect material transfer device as described in claim 5 in which said stabilizing portion has side portions defining a portion of said aperture for receiving said one locking tab therein, said side portions are adjacent to said one locking tab.

8. A quick connect material transfer device as described in claim 7 in which said stabilizing portion has an end ring portion defining a portion of said aperture for receiving said one locking tab therein and defining one end of said one of said body and said locking sleeve, said side portions formed integrally with said end ring portion.

9. A quick connect material transfer device as described in claim 3 in which the other of said body and said locking sleeve contacts said one locking tab in said tab locking position to lock said locking tabs in said secured position.

10. A quick connect material transfer device as described in claim 9 in which said one locking tab has a raised portion, said raised portion in contact with said other of said body and said locking sleeve when in said tab locking position.

11. A quick connect material transfer device as described in claim 3 in which said one locking tab has an arm portion extending from said hinge portion to said connector engaging lip.

12. A quick connect material transfer device as described in claim 3 in which one of said body and said locking sleeve having at least one locking protrusion integrally formed therewith, the other of said body and said locking sleeve having at least one raised portion for contacting said locking protrusion and restraining disassembly of said body and said locking sleeve.

13. A quick connect material transfer device as described in claim 3 in which said body or said locking sleeve has at least one assembly prong and said body or said locking sleeve not having said one assembly prong having a prong engaging surface for engaging said one assembly prong, said one prong having a bearing surface in contact with said prong engaging surface, said prong engaging surface having a stop surface for contacting said one prong and restraining disassembly of said body and said locking sleeve.

14. A quick connect material transfer device as described in claim 13 in which said body or said locking sleeve not having said prong thereon having a raised stop portion for restraining disassembly of said body and said locking sleeve.

15. A tire sealant material transfer device for transferring tire sealant material from a pressurized container to a tire connector including:
    a quick connect fitting for fluidically connecting to the tire connector, said quick connect fitting having
    a one piece plastic body having one end for receiving material from the pressurized container and another end selectively attachable to and detachable from the tire connector, said plastic body having a fluid passageway extending from said one end to said other end and,
    a plastic locking sleeve mounted on said plastic body for selectively locking and unlocking said body to the tire connector,
    one of said body and said locking sleeve having at least one locking tab integrally formed therewith, said one locking tab having a hinge portion and a connector engaging lip pivotal about said hinge portion and engagable with the connector, said one of said body and said locking sleeve has at least one aperture therein for receiving said one locking tab therein, said one locking tab moveable between a secured position in which said connector engaging lip is engageable by the connector and an unlocked position, said body and said locking sleeve movable with respect to each other between a tab unlocking position and a tab locking position to lock said locking tabs in said secured position.

16. A tire sealant material transfer device as described in claim 15 having an end ring portion which has an outer stop portion for contacting the other of said body and said locking sleeve to limit relative movement of said body and said locking sleeve in one direction.

17. A tire sealant material transfer device as described in claim 15 in which said one of said body and said locking sleeve has a stabilizing portion adjacent said connector engaging lip and defining a portion of said aperture for receiving said one locking tab therein.

18. A tire sealant material transfer device as described in claim 17 in which said stabilizing portion has an end ring portion defining a portion of said aperture for receiving said one locking tab therein and defining one end of said one of said body and said locking sleeve.

19. A tire sealant material transfer device as described in claim 17 in which said stabilizing portion has side portions defining a portion of said aperture for receiving said one locking tab therein, said side portions are adjacent to said one locking tab.

20. A tire sealant material transfer device as described in claim 19 in which said stabilizing portion has an end ring portion defining a portion of said aperture for receiving said one locking tab therein and defining one end of said one of said body and said locking sleeve, said side portions formed integrally with said end ring portion.

21. A tire sealant material transfer device as described in claim 15 in which the other of said body and said locking sleeve contacts said one locking tab in said tab locking position to lock said locking tabs in said secured position.

22. A tire sealant material transfer device as described in claim 21 in which said one locking tab has a raised portion, said raised portion in contact with said other of said body and said locking sleeve when in said tab locking position.

23. A tire sealant material transfer device as described in claim 15 in which said one locking tab has an arm portion extending from said hinge portion to said connector engaging lip.

24. A tire sealant material transfer device as described in claim 15 in which one of said body and said locking sleeve having at least one locking protrusion integrally formed therewith, the other of said body and said locking sleeve having at least one raised portion for contacting said locking protrusion and restraining disassembly of said body and said locking sleeve.

25. A tire sealant material transfer device as described in claim 15 in which said body or said locking sleeve has at least one assembly prong and said body or said locking sleeve not having said one assembly prong having a prong engaging surface for engaging said one assembly prong, said one prong having a bearing surface in contact with said prong engaging surface, said prong engaging surface having a stop surface for contacting said one prong and restraining disassembly of said body and said locking sleeve.

26. A method of attaching a tire sealant material transfer device to the connector on a tire including the steps of:
   positioning a quick connect fitting having a fluid passageway adjacent a fluid passageway of the tire connector,
   moving said fitting and said connector together to receive the outer surface of the tire connector in an end ring portion and stabilizing portions of said quick connect fitting,
   continue moving said fitting and said connector together and pivotally move the connector engaging lip of a locking tab formed integrally with a plastic body of the quick connector into engagement with the outer surface of the tire connector so that said fluid passageways of said fitting and said connector are in fluid communication with each other,
   moving the locking collar of said quick connect fitting along said body of said fitting to contact said connector engaging lip and lock said connector engaging lip to said tire connector.

27. A method of attaching a tire sealant material transfer device to the connector on a tire as described in claim 26 in which the step of continue moving said fitting and said connector together includes the step of opening a valve in said fluid passageway of said connector.

28. A method of attaching a tire sealant material transfer device to the connector on a tire as described in claim 26 in which the step of continue moving said fitting and said connector together includes the step of fluidically sealing said fitting and said connector together.

* * * * *